United States Patent [19]

Kobayashi

[11] Patent Number: 5,710,799
[45] Date of Patent: Jan. 20, 1998

[54] CROSS POLARIZATION INTERFERENCE CANCELER AND CROSS POLARIZATION INTERFERENCE ELIMINATING APPARATUS USING THE SAME

[75] Inventor: Kenzo Kobayashi, Kawasaki, Japan

[73] Assignee: Fujitsu Limited, Kanagawa, Japan

[21] Appl. No.: 190,067

[22] PCT Filed: Jun. 1, 1993

[86] PCT No.: PCT/JP93/00735

§ 371 Date: Feb. 1, 1994

§ 102(e) Date: Feb. 1, 1994

[87] PCT Pub. No.: WO93/25019

PCT Pub. Date: Dec. 9, 1993

[30] Foreign Application Priority Data

| Jun. 1, 1992 | [JP] | Japan | 4-140721 |
| Jun. 1, 1992 | [JP] | Japan | 4-140722 |
| Aug. 28, 1992 | [JP] | Japan | 4-229693 |

[51] Int. Cl.[6] .................................. H04B 1/10
[52] U.S. Cl. .................. 375/349; 375/346; 455/295; 455/296; 341/118
[58] Field of Search ................... 375/346, 349, 375/348; 455/295, 296, 309, 312; 341/118

[56] References Cited

U.S. PATENT DOCUMENTS

| 3,963,990 | 6/1976 | DiFonzo | 325/60 |
| 3,973,258 | 8/1976 | Cerni | 343/6 |
| 4,438,530 | 3/1984 | Steinberger | 455/278 |
| 4,479,258 | 10/1984 | Namiki | 455/295 |
| 4,637,067 | 1/1987 | Steinberger | 375/346 |
| 4,688,235 | 8/1987 | Tahara | 375/349 |
| 4,910,468 | 3/1990 | Ohtsuka | 375/349 |
| 4,914,676 | 4/1990 | Iwamatsu | 375/349 |
| 5,023,620 | 6/1991 | Matsuura | 375/349 |
| 5,068,667 | 11/1991 | Mizoguchi | 455/296 |

FOREIGN PATENT DOCUMENTS

| 59-107656 | 6/1984 | Japan. |
| 3254523 | 11/1991 | Japan. |
| 423632 | 1/1992 | Japan. |

*Primary Examiner*—Wellington Chin
*Assistant Examiner*—Vijay Shankar

[57] ABSTRACT

A cross polarization interference canceler includes a digital conversion unit for subjecting a demodulated signal of one channel to an analog-to-digital conversion out of two channels which are independently formed, using carriers having the same frequency but having planes of polarization which are mutually orthogonal. An interference canceling unit is provided for canceling interference caused by the other channel of the two channels, with respect to the demodulated signal which is digitally converted by the digital conversion unit. The canceler further includes an integrator for carrying out an integration process with respect to the demodulated signal which is digitally converted by the digital conversion unit so as to provide a negative feedback to the digital conversion unit.

4 Claims, 30 Drawing Sheets

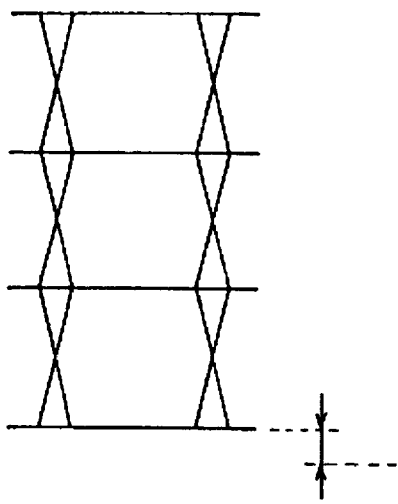
FIG.3a
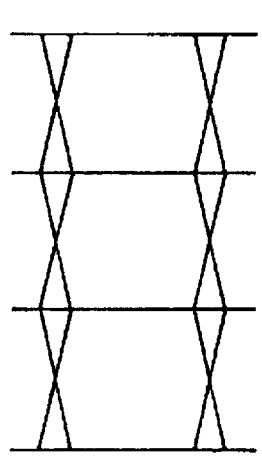
FIG.3b
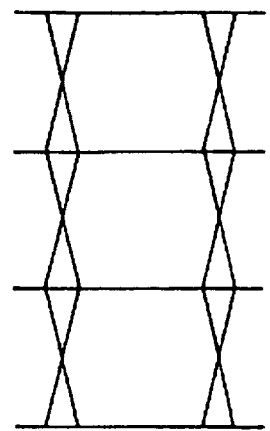
FIG.3c
FIG. 4
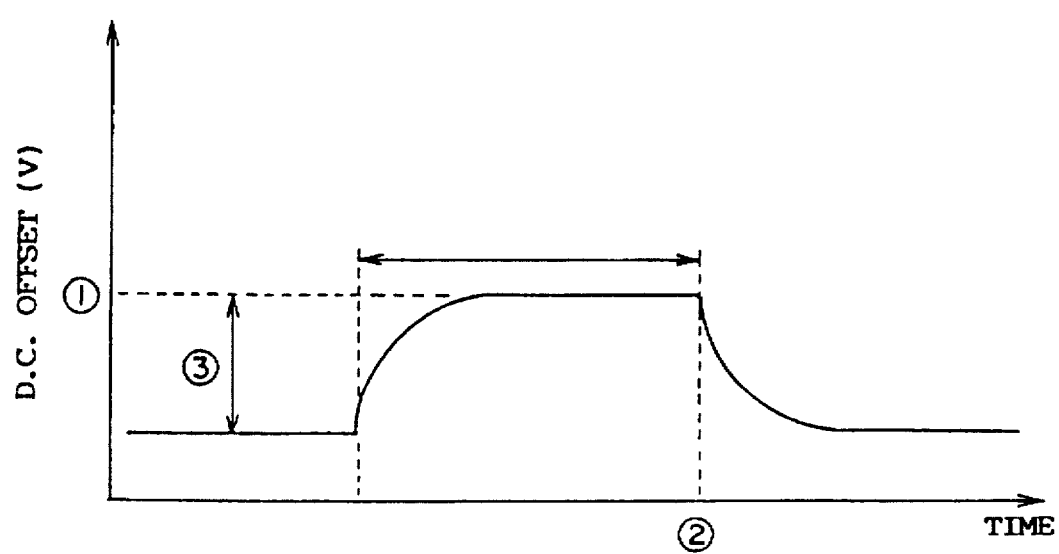

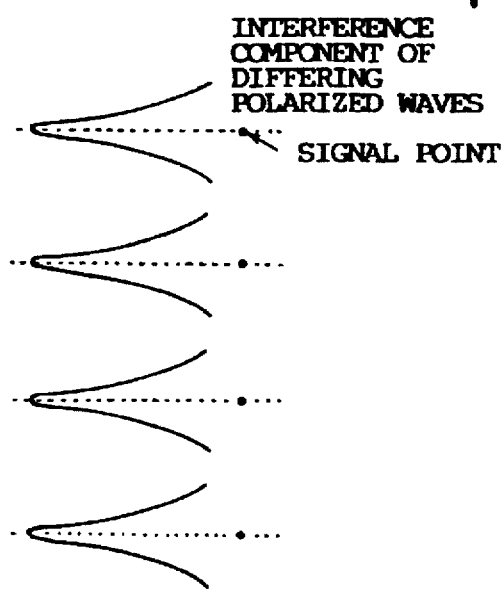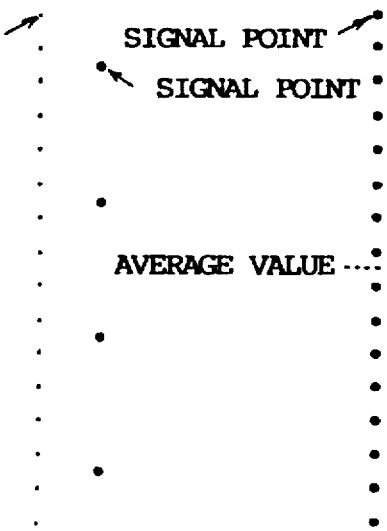
FIG. 7a  FIG. 7b  FIG. 7c
FIG. 8

FIG. 28
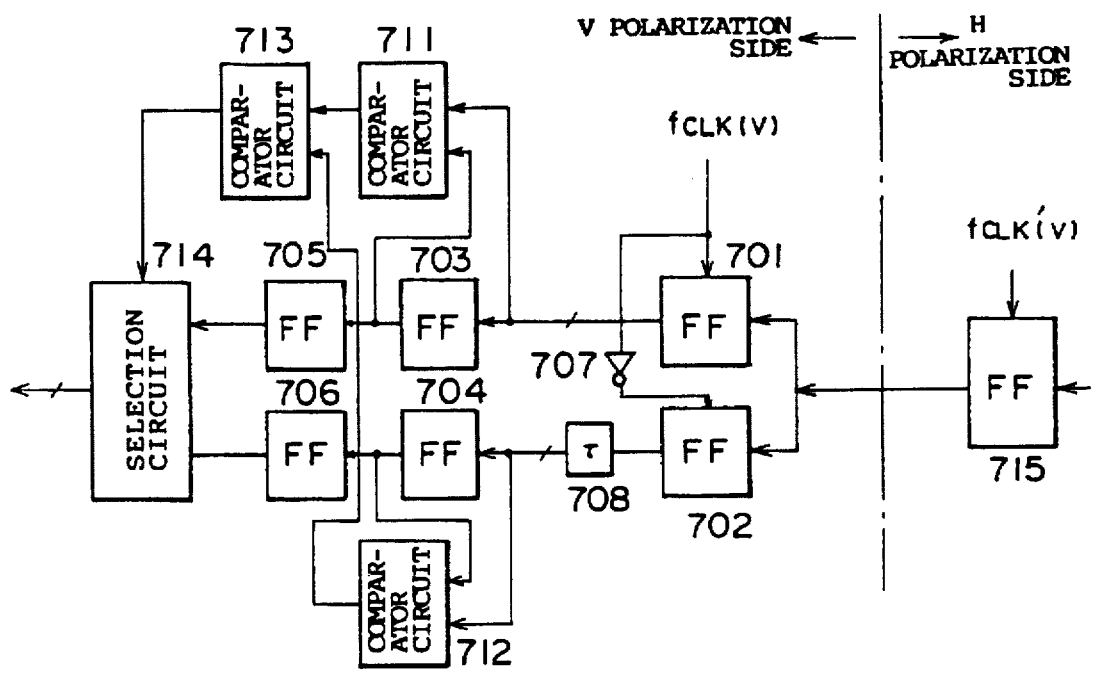
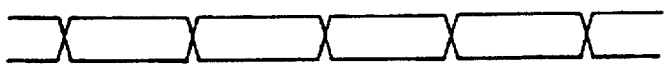
FIG.29a
FIG.29b
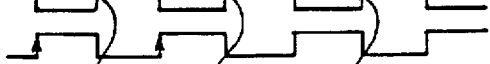
FIG.29c
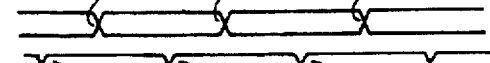
FIG.29d
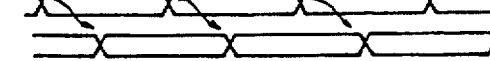
FIG.29e
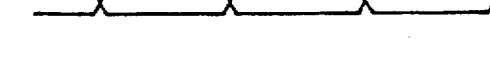
FIG.29f
→ TIME

CROSS POLARIZATION INTERFERENCE CANCELER AND CROSS POLARIZATION INTERFERENCE ELIMINATING APPARATUS USING THE SAME

TECHNICAL FIELD

The present invention generally relates to cross polarization interference cancelers and cross polarization interference eliminating apparatuses using the same, and more particularly to a cross polarization interference canceler which mutually cancels interference of one channel with respect to another channel in a system such as a radio communication system which forms two channels in parallel using carriers which have the same frequency but have mutually orthogonal planes of polarization, and to a cross polarization interference eliminating apparatus which uses such a cross polarization interference canceler.

BACKGROUND ART

An orthogonal polarization sharing system which forms two channels (co-channels) with suppressed interference by making two carriers having the same frequency have mutually orthogonal planes of polarization is an advantageous system from the point of view of effectively utilizing the radio frequency, and is thus employed in transmission apparatuses such as digital multiplexed wireless installations. In such a transmission apparatus, a deviation is introduced in the plane of polarization due to a distortion of a propagation path caused by rain or the like, and each channel receives the interference from the other channel. Hence, a cross polarization interference canceler is provided at a receiving end to suppress such interference.

FIG. 1 shows an example of the construction of a receiver part of a transmission apparatus which uses the orthogonal polarization sharing system. In FIG. 1, a receiving antenna 91 is connected to an input of a polarization branching filter 92, and one output of the polarization branching filter 92 is connected to an input of a demodulator $94_1$ via a frequency converter $93_1$. One output of the demodulator $94_1$ supplies a first demodulated signal to a latter stage via a cross polarization interference canceler $95_1$. The other output of the polarization branching filter 92 is connected to an input of a demodulator $94_2$ via a frequency converter $93_2$, and one output of the demodulator $94_2$ supplies a second demodulated signal to a latter stage via a cross polarization interference canceler $95_2$. The other output of the demodulator $94_1$ is connected to the other input of the demodulator $94_2$, and the other output of the demodulator $94_2$ is connected to the other input of the demodulator $94_1$. Various signals related to the suppression of the interference described above are exchanged between the demodulator $94_1$ and the cross polarization interference canceler $95_1$ and between the demodulator $94_2$ and the cross polarization interference canceler $95_2$. The demodulators $94_1$ and $94_2$ have the same construction, and the cross polarization interference cancelers $95_1$ and $95_2$ have the same construction.

FIG. 2 shows the construction of the cross polarization interference canceler and the demodulator. In the demodulator $94_1$ ($94_2$), an intermediate frequency signal from the frequency converter $93_1$ ($93_2$) is applied to an input of a hybrid 102 via an AGC amplifier 101. A first output of the hybrid 102 is connected to one input of a multiplier $103_1$, and a second output of the hybrid 102 is connected to one input of a multiplier $103_2$. An output of the multiplier $103_1$ is connected to an input of an analog-to-digital (A/D) converter 1061 via a lowpass filter $104_1$ and an AGC amplifier $105_1$, to an output of an amplifier $107_1$, and to a first differing polarization output terminal. An output of the multiplier $103_2$ is connected to an input of an analog-to-digital (A/D) converter $106_2$ via a lowpass filter $104_2$ and an AGC amplifier $105_2$, to an output of an amplifier $107_2$, and to a second differing polarization output terminal. A third output of the hybrid 102 is connected to an input of a hybrid 108, and first and second outputs of the hybrid 108 are respectively connected to inputs of a multiplier 109. An output of the multiplier 109 is connected to one input of a mixer 112 via a bandpass filter 110 and a limiter 111, and an output of the mixer 112 is connected to an input of a voltage controlled oscillator 114 via an integrator 113.

An output of the voltage controlled oscillator 114 is connected to the other input of the mixer 112, the inputs of variable phase converters $115_1$ and $115_2$, and clock inputs of A/D converters $116_1$ and $116_2$. An output of the variable phase converter $115_1$ is connected to the clock input of the A/D converter $116_1$, and an output of the variable phase converter $115_2$ is connected to the clock input of the A/D converter $116_2$. One differing polarization input terminal is connected to an input of the A/D converter $116_1$ via an amplifier $117_1$, and the other differing polarization input terminal is connected to an input of the A/D converter $116_2$ via an amplifier $117_2$. Outputs of the A/D converters $106_1$, $106_2$, $116_1$ and $116_2$ are respectively connected to corresponding inputs of the cross polarization interference canceler $95_1$ ($95_2$). Control inputs of the AGC amplifiers $105_1$ and $105_2$ and inputs of the amplifiers $107_1$, $107_2$ and 118 are respectively connected to corresponding outputs of the cross polarization interference canceler $95_1$ ($95_2$). An output of the amplifier 118 is connected to an input of a voltage controlled oscillator 120 via an integrator 119, and an output of the voltage controlled oscillator 120 is connected to an input of a 90° hybrid 121. A first output of the 90° hybrid 121 is connected to the other input of the multiplier $103_1$, and a second output of the 90° hybrid 121 is connected to the other input of the multiplier $103_2$.

In the cross polarization interference canceler $95_1$ ($95_2$), an output of the A/D converter $106_1$ is connected to inputs of transversal filters (TR) $122_1$ and $122_2$, and an output of the transversal filter $122_1$ is connected to one input of a subtracter $123_1$. An output of the subtracter $123_1$ is connected to one input of a subtracter $124_1$, and an output of the subtracter $124_1$ supplies a first demodulated signal to one input of a carrier reproducing part (CR) 125, the control input of the AGC amplifier $105_1$, the input of the amplifier $107_1$ and the latter stage. An output of the A/D converter $106_2$ is connected to inputs of transversal filters (TR) $122_3$ and $122_4$, and an output of the transversal filter $122_3$ is connected to one input of a subtracter $123_2$. An output of the subtracter $123_2$ is connected to one input of a subtracter $124_2$, and an output of the subtracter $124_2$ supplies a second demodulated signal to the other input of the carrier reproducing part (CR) 125, the control input of the AGC amplifier $105_2$, the input of the amplifier $107_2$ and the latter stage.

An output of the transversal filter $122_2$ is connected to the other input of the subtracter $123_2$, and an output of the transversal filter $122_4$ is connected to the other input of the subtracter $123_1$. The output of the A/D converter $116_1$ is connected to inputs of transversal filters $126_1$ and $126_2$, and the output of the A/D converter $116_2$ is connected to inputs of transversal filters $126_3$ and $126_4$. An output of the transversal filter $126_1$ is connected to one input of a subtracter $127_1$, and an output of the transversal filter $126_3$ is connected to one input of a subtracter $127_2$. An output of the subtracter $127_1$ is connected to the other input of the subtracter $124_1$, and an output of the subtracter $127_2$ is connected to the other input of the subtracter $124_2$. An output of the transversal filter $126_2$ is connected to the other input of the subtracter $127_2$, and an output of the transversal filter $126_4$ is connected to the other input of the subtracter $127_1$.

In such a receiver part, a received wave which is received via the antenna 91 is separated into mutually orthogonal polarization components via the polarization branching filter 92. The mutually orthogonal polarization components are respectively converted into intermediate frequency signals having predetermined frequencies by the frequency converters $93_1$ and $93_2$, and the intermediate frequency signals are respectively supplied to the demodulators $94_1,2$.

In the demodulator $94_1$ ($94_2$), the AGC amplifier 101 and the hybrid 102 respectively amplify the intermediate frequency signal to a predetermined level, and supply the amplified intermediate frequency signal to the multipliers $103_1$ and $103_2$ and the hybrid 108. The multipliers $103_1$ and $103_2$ respectively multiply the branched intermediate frequency signal and the mutually orthogonal reproduced carriers which are received via the 90° hybrid 121. Hence, the intermediate frequency signal is demodulated and two orthogonal baseband signals are output.

On the other hand, the hybrid 108 and the multiplier 109 subject the above described intermediate frequency signal to a homodyne wave detection, and a resulting detection output is supplied to the mixer 112 via the bandpass filter 110 and the limiter 111. The mixer 112 multiplies the detection signal and a clock signal received from the voltage controlled oscillator 114, and the integrator 113 obtains a voltage signal by integrating the multiplication result. This voltage signal from the integrator 113 variably controls the oscillation frequency of the voltage controller oscillator 114. Accordingly, a clock which is in phase synchronism with the above detection signal is obtained at the output of the voltage controlled oscillator 114.

The A/D converter $106_1$ receives the baseband signal via the lowpass filter $104_1$ and the AGC amplifier $105_1$, and the A/D converter $106_2$ receives the baseband signal via the lowpass filter $104_2$ and the AGC amplifier $105_2$. The A/D converters $106_1$ and $106_2$ convert the two baseband signals into corresponding digital signals based on the clock received from the voltage controlled oscillator 114. The variable phase converters $115_1$ and $115_2$ respectively finely adjust the phase of the clock supplied to the A/D converters $106_1$ and $106_2$.

The transversal filters $122_1$ through $122_4$ respectively have the same equalizating characteristic adapted to the characteristic of the radio transmission path, and compensates for the distortion component of the above two baseband signals by a digital processing using the A/D converters $106_1$ and $106_2$. The subtracters $123_1$ and $123_2$ subtract the components of the two baseband signals from each other to correct orthogonal errors included in these baseband signals. In addition, the A/D converters $116_1$ and $116_2$ receive two orthogonal baseband signals output from the respective AGC amplifiers $105_1$ and $105_2$ of the demodulator $94_2$ ($94_1$) corresponding to the polarized wave on the opposite side via the respective amplifiers $117_1$ and $117_2$, and convert these baseband signals into digital signals in response to the clock received from the voltage controlled oscillator 114. The transversal filters $126_1$ through $126_4$ compensate for the distortion of the transmission path by the same equalizating characteristic as the transversal filters $122_1$ through $122_4$, and the subtracters $127_1$ and $127_2$ correct the orthogonal errors similarly to the subtracters $123_1$ and $123_2$.

The subtracter $124_1$ and $124_2$ cancel the interference components between the channels by obtaining a difference of the baseband signals in the channels corresponding to the two different polarized waves, and supply to the latter stage the two baseband signals which are obtained as a result of this cancellation. In addition, these two baseband signals obtained are subject to the carrier reproducing process of the carrier reproducing part 125 and are fed back to the control inputs of the AGC amplifiers $105_1$ and $105_2$ and used to compensate for a level deviation of each baseband signal, and are fed back to the A/D converters $106_1$ and $106_2$ via the respective amplifiers $107_1$ and $107_2$ to control and compensate for a D.C. offset introduced by the digital conversion.

Furthermore, in the cancellation control of such a cross polarization interference, an eye-pattern of each of the baseband signals obtained at the output ends of the subtracters $124_1$ and $124_2$ should nrmally include no D.C. offset described above, as shown in FIG. 3(a). However, since the D.C. offset indicated by "1" in FIG. 4 accompanying the digital conversion carried out by the A/D converters $106_1$ and $106_2$ is supplied to the subtracters $124_1$ and $124_2$ without being compensated, an eye-pattern shown in FIG. 3(b) is obtained. But such D.C. offsets are mutually cancelled via a drift control loop which is formed at the input ends of the A/D converters $106_1$ and $106_2$ via the amplifiers $107_1$ and $107_2$, and each apparent baseband signal becomes normal as shown in FIG. 3(c).

In addition, a reproduced carrier signal output from the carrier reproducing part 125 is supplied to the voltage controlled oscillator 120 via the amplifier 118 and the integrator 119, and the above described reference carrier signal is obtained from the output of the voltage controlled oscillator 120.

In the conventional cross polarization interference canceler described above, when it is detected that the reference carrier signal generated in the demodulator on the side of the differing polarized wave may for some reason is non-synchronous to a received wave of the corresponding polarized wave or it is detected that there is a possibility of entering such a non-synchronous state, a cross reset is carried out to automatically or manually stop the operations of the transversal filters $126_1$ through $126_4$ and the subtracters $127_1$ and $127_2$ of the cross polarization interference canceler corresponding to the polarized wave opposite to the received wave. In this case, the D.C. offsets of the A/D converters $116_1$ and $116_2$ supplied to the subtracters $124_1$ and $124_2$ suddenly disappear as indicated by "2" in FIG. 4. But because the drift control loop carries out the compensation control which follows such a disapperance, the control may diverge, and the eye-pattern may become distorted thereby deteriorating the bit error rate.

DISCLOSURE OF THE INVENTION

Accordingly, it is a general object of the present invention to provide a novel and useful cross polarization interference canceler and a cross polarization interference eliminating apparatus, in which the problems described above are eliminated.

Another and more specific object of the present invention is to provide a cross polarization interference canceler comprising digital conversion means for subjecting a demodulated signal of one channel to an analog-to-digital conversion out of two channels which are independently formed using carriers having the same frequency but having planes of polarization which are mutually orthogonal, interference canceling means for canceling interference caused by the other channel out of said two channels, with respect to the demodulated signal which is digitally converted by said digital conversion means, and integrator means for carrying out an integration process with respect to the demodulated signal which is digitally converted by said digital conversion means so as to make a negative feedback to said digital conversion means. According to the cross polarization interference canceler of the present invention, a negative feedback path for suppressing the D.C. offset accompanying the digital conversion of the demodulated signal subject to the interference canceling is formed at a stage prior to the interference canceling means which cancels the interference between the channels adapted to the differing polarization sharing system, so that the D.C. offset is stably suppressed even in a state where the demodulated signal corresponding to the interference wave is not given. In addition, by making the negative feedback of the D.C. offset accompanying the digital conversion of the demodulated signal of the interference wave to the interference canceling means, it is possible to suppress transmission of the D.C. offset with respect to the output end of the interference canceling means. In other words, the D.C. offset included in the demodulated signal which is obtained by carrying out the interference canceling process is stable and positively suppressed compared to the conventional example regardless of whether the demodulated signal of the interference wave is given. Hence, it is possible to reduce the probability of generating the identification error caused by the D.C. offset, and the performance of the receiver apparatus corresponding to the differing polarization sharing system.

Still another object of the present invention is to provide a cross polarization interference canceler comprising digital conversion means for subjecting a demodulated signal of one channel to an analog-to-digital conversion out of two channels which are independently formed using carriers having the same frequency but having planes of polarization which are mutually orthogonal, interference canceling means for canceling interference caused by said one channel out of said two channels by subtracting from a demodulated signal of the other channel a component of the demodulated signal which is digitally converted by said digital conversion means, and integrator means for carrying out an integration process with respect to the demodulated signal which is cancelled of the interference by said interference canceling means so as to make a negative feedback to said interference canceling means.

A further object of the present invention is to provide a cross polarization interference eliminating apparatus comprising, independently with respect to first and second polarized waves demodulator means for demodulating by a quasi-synchronous detection system one polarized wave out of the first and second polarized waves which are received and have a cross polarization relationship, a transversal equalizer carrying out a wave equalization with respect to an output demodulated data of said demodulator means, a reference signal generating circuit generating a reference signal which is eliminated of phase rotation based on phase rotation control information and baseband signal obtained from a part of the demodulator means on the side of the other polarized wave of said demodulator means, a cross polarization interference canceler generating an interference canceling signal corresponding to an interference wave component included in the output demodulated data of said demodulator means based on the reference signal obtained from said reference signal generating circuit, an adder circuit outputting demodulated in-phase signal and quadrature signal by adding the output interference canceling signal of said cross polarization interference canceler to the output demodulated data of said transversal equalizer, and a controller generating a phase rotation control signal from the output in-phase signal and quadrature signal of said adder circuit and feeding back the same to said demodulator means. According to the cross polarization interference eliminating apparatus of the present invention, the interference wave component from the side of the other polarized wave leaking within the demodulated data obtained from the transversal equalizer, and the interference canceling signal from the cross polarization interference canceler, can be made to be synchronized signals. For this reason, even if the quasi-synchronous detection system is employed, it is possible to greatly reduce or eliminate the cross polarization interference. Hence, the digital signal processing becomes possible in the demodulator to a large extent, thereby contributing to the reduction in the size and weight of the demodulator and to the high reliability of the demodulator.

Another object of the present invention is to provide a quadrature demodulating circuit comprising wave detection means for obtaining first and second analog signal by carrying out a quasi-synchronous detection with respect to an input digital modulated signal using two demodulating carriers having a fixed frequency and phases which mutually differ by 90° in phase, first and second analog filters, used for eliminating aliasing noise, eliminating high-frequency components of said first and second analog signals from said wave detection means, first and second analog-to-digital converters carrying out an analog-to-digital conversion with respect to each of output analog signals of said first and second analog filters by a second sampling frequency which is higher than an existing first sampling frequency, first and second digital filters eliminating high-frequency components of at least a frequency greater than or equal to ½ said first sampling frequency from each of output digital signals of said first and second analog-to-digital converters, a speed conversion circuit converting a sampling frequency of each of output digital signals of said first and second digital filters to said first sampling frequency, and an output circuit obtaining demodulated data by mutually canceling phase rotation after subjecting output digital signals of said speed conversion circuit to a wave shaping. According to the quadrature demodulating circuit of the present invention, the slope of the frequency characteristic of the analog filter on the input side of the A/D converter can be made more gradual compared to the conventional case. For this reason, the circuit construction of the above analog filter which is an anti-aliasing filter can be made simple without increasing the processing speed of the roll-off filter.

Still another object of the present invention is to provide a quadrature demodulating circuit comprising wave detection means for obtaining first and second analog signal by carrying out a quasi-synchronous detection with respect to an input digital modulated signal using two demodulating carriers having a fixed frequency and phases which mutually differ by 90° in phase, first and second analog filters, used for eliminating aliasing noise, eliminating high-frequency components of said first and second analog signals from said wave detection means, first and second analog-to-digital converters carrying out an analog-to-digital conversion with respect to each of output analog signals of said first and second analog filters by a second sampling frequency which is higher than an existing first sampling frequency, phase rotation means for mutually canceling phase rotation of each of output digital signals of said first and second analog-to-digital converters, first and second digital filters eliminating high-frequency components of a frequency at least greater than or equal to ½ said first sampling frequency from output digital signals of said phase rotation means, and an output circuit generating and outputting demodulated data by carrying out a wave shaping after converting the sampling frequency of each output digital signal if said first and second digital filters to said first sampling frequency. According to the quadrature demodulating circuit of the present invention, the phase rotation elimination is carried out with respect to the input digital signal of the roll-off filter. For this reason, it is possible to carry out the demodulation without deteriorating the bit error rate, even when the frequency difference between the input digital modulated signal and the demodulating carrier from the oscillator used for the quasi-synchronous detection is large.

Other objects and further features of the present invention will be apparent from the following detailed description when read in conjunction with the accompanying description.

BRIEF DESCRIPTION OF THE DRAWINGS

FIGS. 3(a–c) are diagram for explaining the operation of the conventional cross polarization interference canceler;

FIG. 4 is a diagram for explaining the problems of the conventional cross polarization interference canceler;

FIGS. 7(a–c) are diagrams showing the distribution of signal points corresponding to the amount of interference between the different polarized waves;

FIG. 8 is a diagram for explaining a drift control method;

FIG. 28 is a system block diagram showing another embodiment of an important part of FIG. 26;

FIGS. 29(a–f) are diagrams a timing chart for explaining the operation of the circuit shown in FIG. 28;

BEST MODE OF CARRYING OUT THE INVENTION

First, a description will be given of the operating principle of a first embodiment of a cross polarization interference canceler according to the present invention, by referring to FIG. 5.

The first embodiment is characterized in that, in a cross polarization interference canceler having a digital conversion means 11 for digitally converting a demodulated signal of one channel out of two channels which are independently formed by carriers which have the same frequency but have planes of polarization which are mutually orthogonal, and an interference canceling means 13 for canceling the interference of the other channel out of the two channels, there is provided an integrator means 15 for subjecting a demodulated signal which is digitally converted in the digital conversion means 11 to an integration process and for making a negative feedback to the digital conversion means 11.

The digital conversion means 11 digitally converts the demodulated signal of one channel which is subject to the interference canceling and supplies the digitally converted demodulated signal to the interference canceling means 13. The integrator means 15 subjects the digitally converted demodulated signal to the integration process, so as to obtain a D.C. offset accompanying the digital conversion and to make a negative feedback to the digital conversion means 11. In other words, since a feedback path for this negative feedback is formed at the stage prior to the interference canceling means 13, it is possible to stably reduce the above D.C. offset even in a state where the demodulated signal of the other channel which becomes an interference wave with respect to the above one channel is not obtained for some reason. Further, when entering and clearing such a state, the steady state of the feedback path will not change as in the conventional example which carries out the negative feedback from the output end of the interference canceling means 13 with respect to the digital conversion means 11, and the interference canceling is made and the deviation introduced in the demodulated signal which is output is similarly suppressed.

Figure 1:
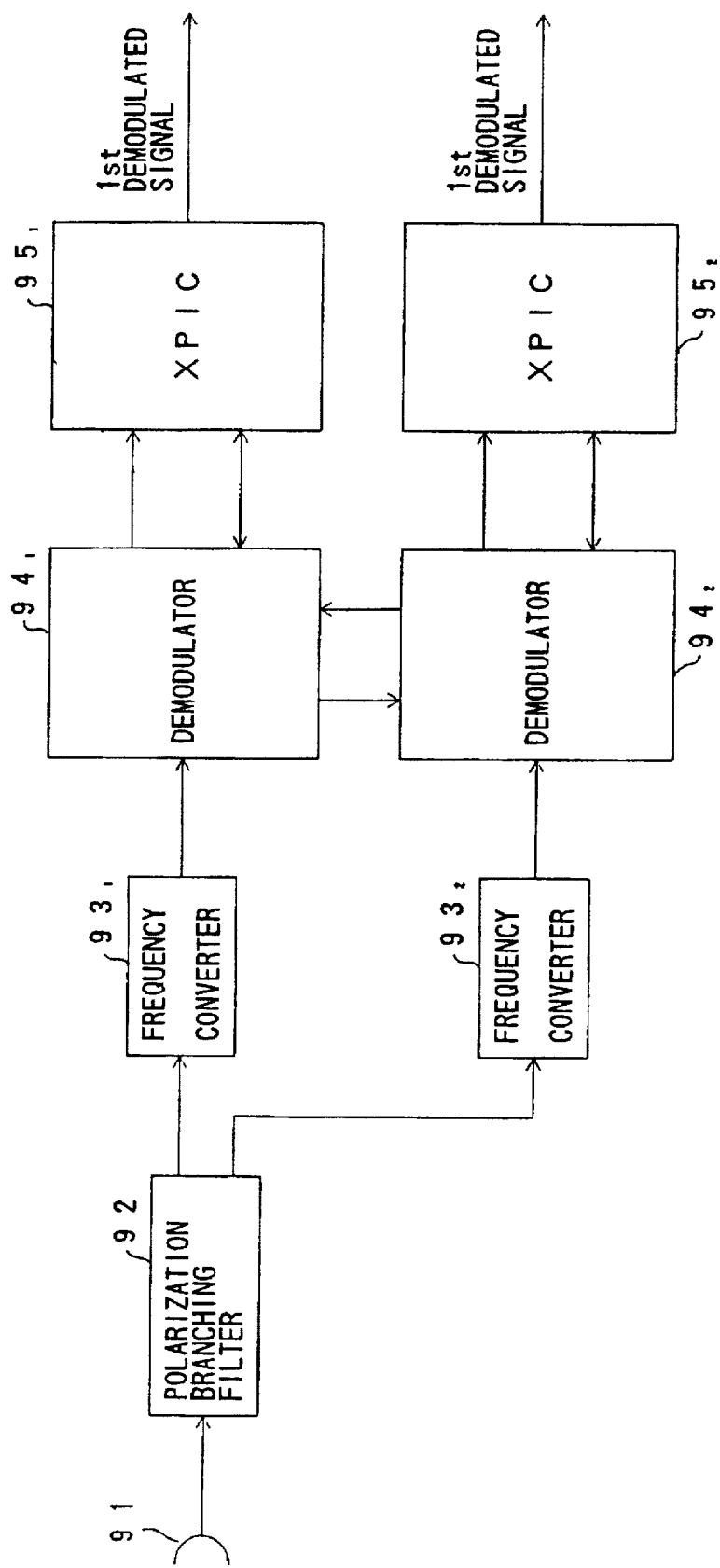
FIG. 1 is a system block diagram showing an example of the construction of a receiver part of a transmission apparatus employing an orthogonal polarization shading system.
Figure 2:
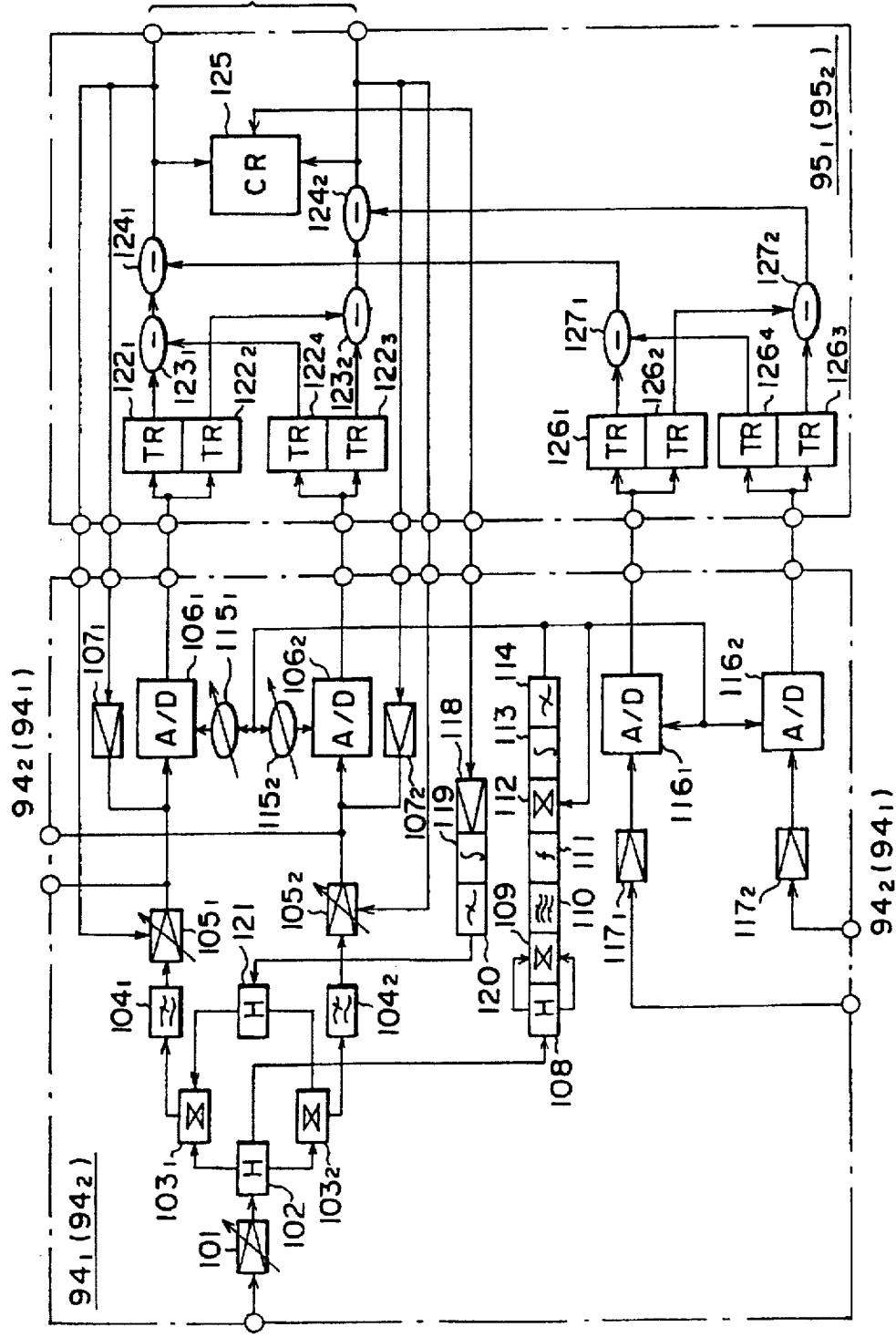
FIG. 2 is a system block diagram showing the construction of a cross polarization interference canceler and a demodulator.
Figure 6:
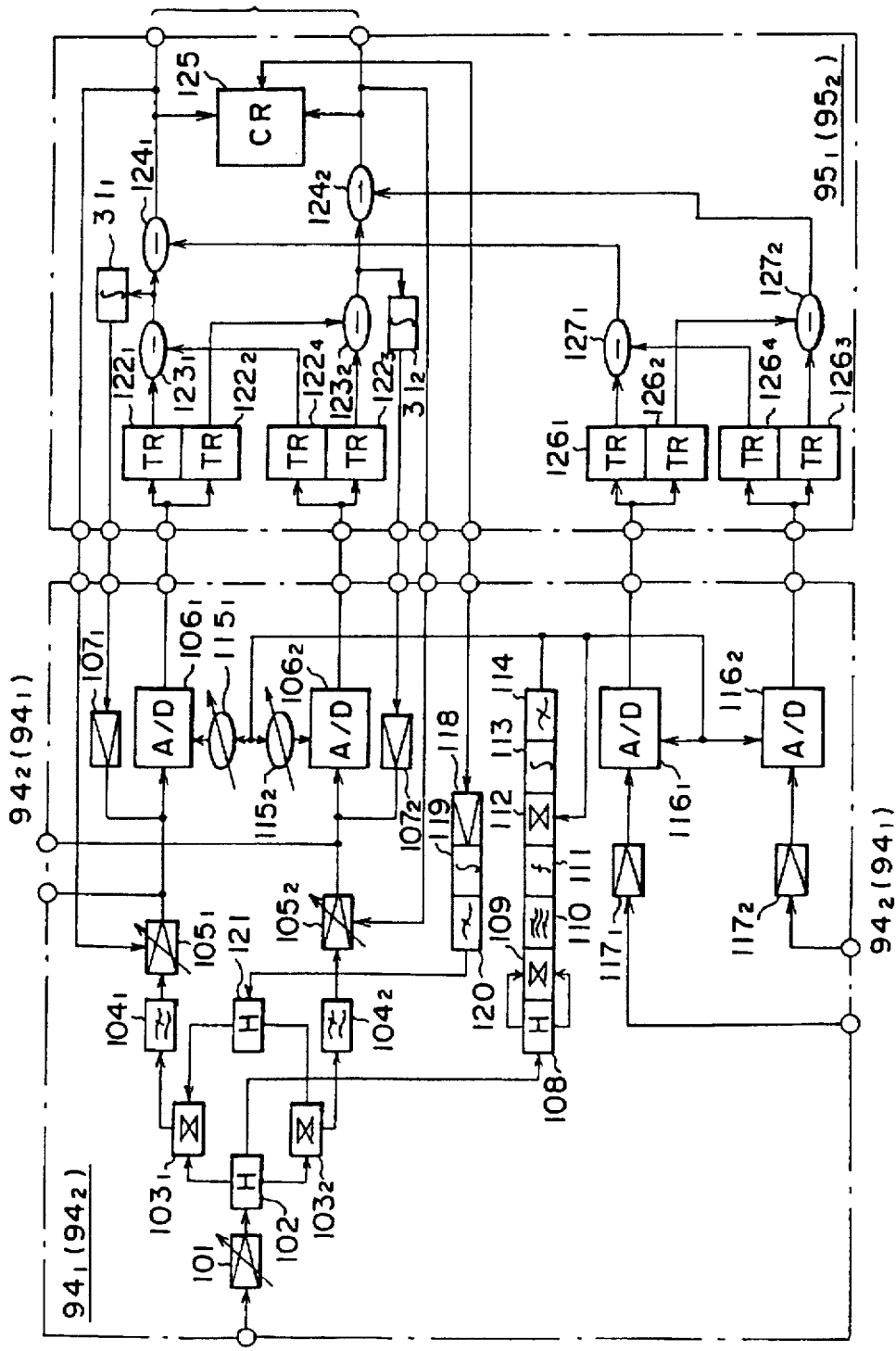
FIG. 6 is a system block diagram showing the first embodiment of the cross polarization interference canceler.

Next, a more detailed description will be given of the first embodiment, by referring to FIGS. 6 through 8. FIG. 6 shows the first embodiment, and in FIG. 6, those parts which have the same function and construction as those corresponding parts in FIG. 2 are designated by the same reference numerals, and a description thereof will be omitted.

This embodiment is characterized in that, the input end of the amplifier $107_1$ is connected to the output of the subtracter $123_1$ via the integrator $31_1$, and the input end of the amplifier $107_2$ is connected to the output of the subtracter $123_2$ via the integrator $31_2$.

Figure 5:
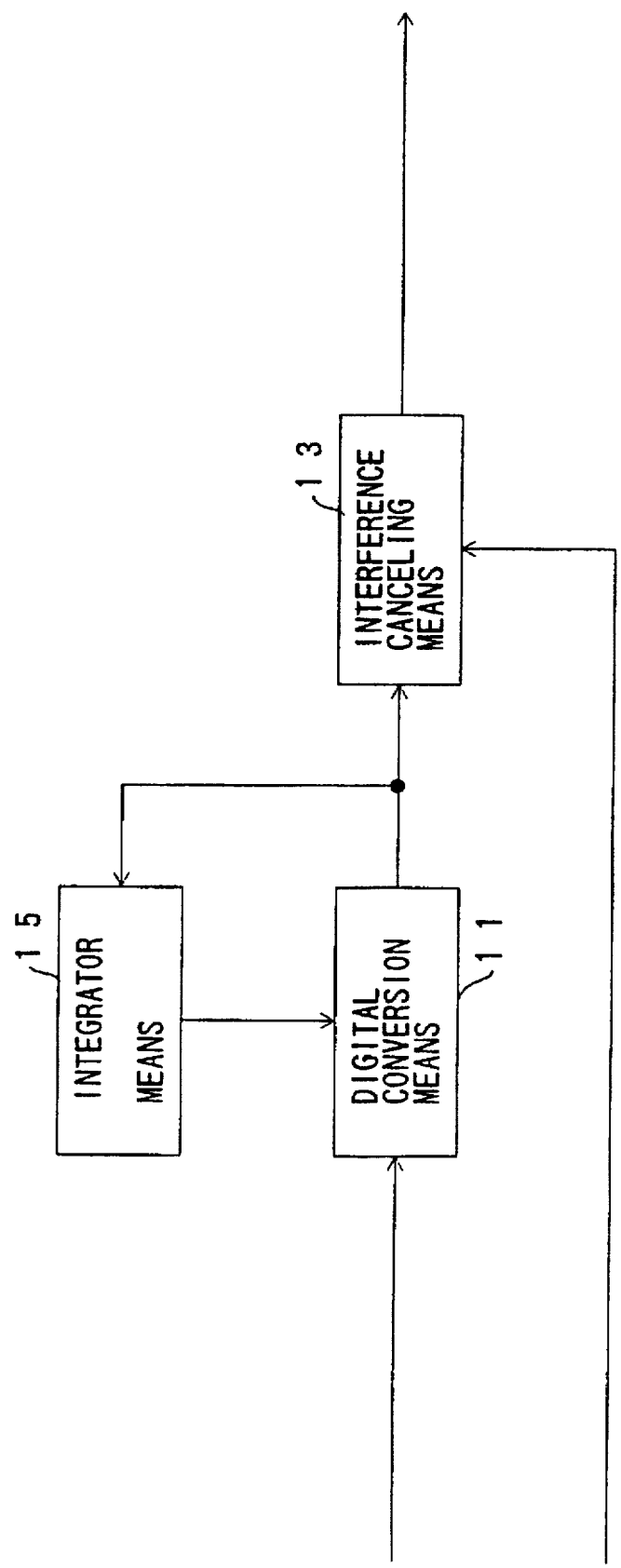
FIG. 5 is a system block diagram for explaining the operating principle of a first embodiment of a cross polarization interference canceler according to the present invention.

With regard to the corresponding relationship of this embodiment and the block diagram shown in FIG. 5, the A/D converter $106_1$ corresponds to the digital conversion means 11. The transversal filters $122_1$ through $122_4$, the subtracters $123_1$, $123_2$, $124_1$ and $124_2$, the A/D converters $116_1$ and $116_2$, the transversal filters $126_1$ through $126_4$ and the subtracters $127_1$ and $127_2$ correspond to the interference canceling means 13. The integrators $31_1$ and $31_2$ and the amplifiers $107_1$ and $107_2$ correspond to the integrator means 15.

The operation of this embodiment will now be described. When each word of the digital baseband signal which is obtained at the output of the A/D converter $106_1$ (hereinafter simply referred to as a "digital baseband signal") indicates the amplitude value of the analog baseband signal applied to the A/D converter $106_1$ (hereinafter simply referred to as an "analog baseband signal") by a pure binary number and in the signal space diagram the distribution of the signal point indicated by such a word is given by a Gaussian distribution, the generation probability of each logic value of the least significant bit of such words (for example, $D_2$ indicated in FIG. 8 in the case of the 16 QAM system) in general becomes partial due to the D.C. offset caused by the digital conversion of the A/D converter $106_1$. The integrator $31_1$ obtains the moving average of the logic value of the above least significant bit for every predetermined number of consecutive words, and carries out a negative feedback (drift control) with respect to the A/D converter $106_1$ via the amplifier $107_1$. Furthermore, the integrator $31_2$ similarly carries out the negative feedback with respect to the A/D converter $106_2$. Accordingly, the D.C. offsets accompanying the digital conversions carried out by the A/D converters $106_1$ and $106_2$ are suppressed by the above negative feedbacks.

In addition, since such negative feedback paths are formed at the stage prior to the subtracter $123_1$ which carries out the interference canceling between the differing polarized waves, the above D.C. offsets are stably suppressed regardless of whether or not the cross reset is made.

The constructions of the integrators $31_1$ and $31_2$ differ depending on the distributions of the signal points of each of the words in the signal space diagram, as described above. If the distribution cannot be given by the Gaussian distribution because of the large interference between the differing polarized waves as shown in FIG. 7(b), for example, the average value of the values each of the words can have as shown in FIG. 7(c) may be negatively fed back to the A/D converters $106_1$ and $106_2$.

Moreover, the operation carried out to obtain such an average value is not limited to the above moving average method, and other methods such as an exponential smoothing method, for example, may be employed. The moving average method will be described later.

Next, a description will be given of the operating principle of a second embodiment of the cross polarization interference canceler according to the present invention, by referring to FIG. 9.

The second embodiment is characterized in that, in a cross polarization interference canceler having a digital conversion means 21 for digitally converting a demodulated signal of one channel out of two channels which are independently formed by carriers which have the same frequency but have planes of polarization which are mutually orthogonal, and an interference canceling means 23 for canceling the interference of the one channel out of the two channels by subtracting the demodulated signal component which is digitally converted by the digital conversion means 21 from a demodulated signal of the other channel, there is provided an integrator means 25 for subjecting the demodulated signal which is cancelled of the interference in the interference canceling means 23 to an integration process and for making a negative feedback to the interference canceling means 23.

The digital conversion means 21 digitally converts the demodulated signal of one channel which becomes the interference wave and supplies the digitally converted demodulated signal to the interference canceling means 23. The integrator means 25 subjects to the integration process the digitally converted demodulated signal of the other channel which is subjected to the interference canceling in the interference canceling means 23, so as to obtain a D.C. offset accompanying the digital conversion and to make a negative feedback to the interference canceling means 23. In other words, compared to the conventional example having no such negative feedback path, it is possible to reduce the above D.C. offset, and to reduce the generation probability of the identification error caused by the D.C. offset included in the demodulated signal which is output from the interference canceling means 23.

Next, a more detailed description will be given of the second embodiment, by referring to FIGS. 10 and 11.

Figure 10:
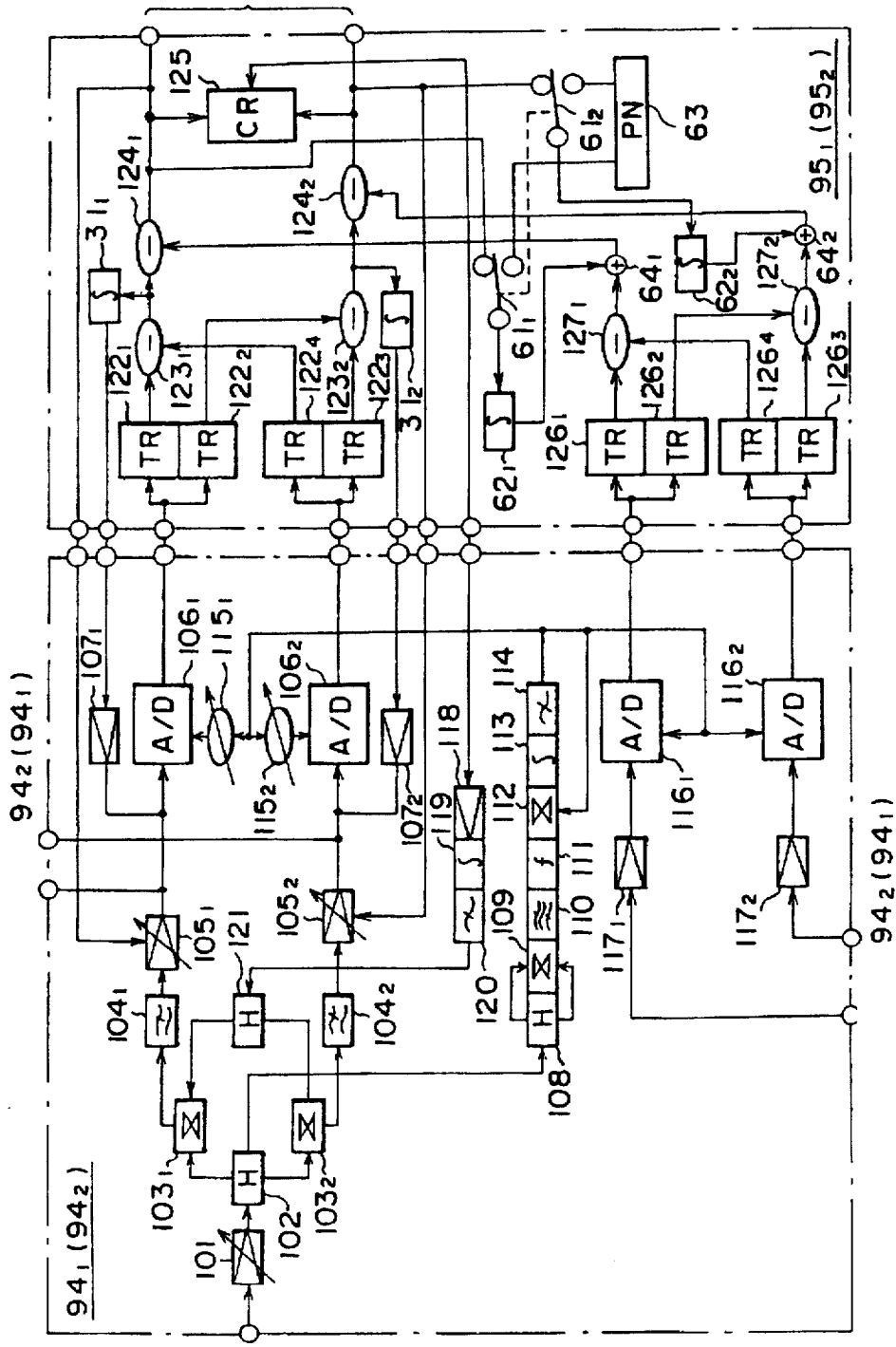
FIG. 10 is a system block diagram showing a the second embodiment of the cross polarization interference canceler.
Figure 11:
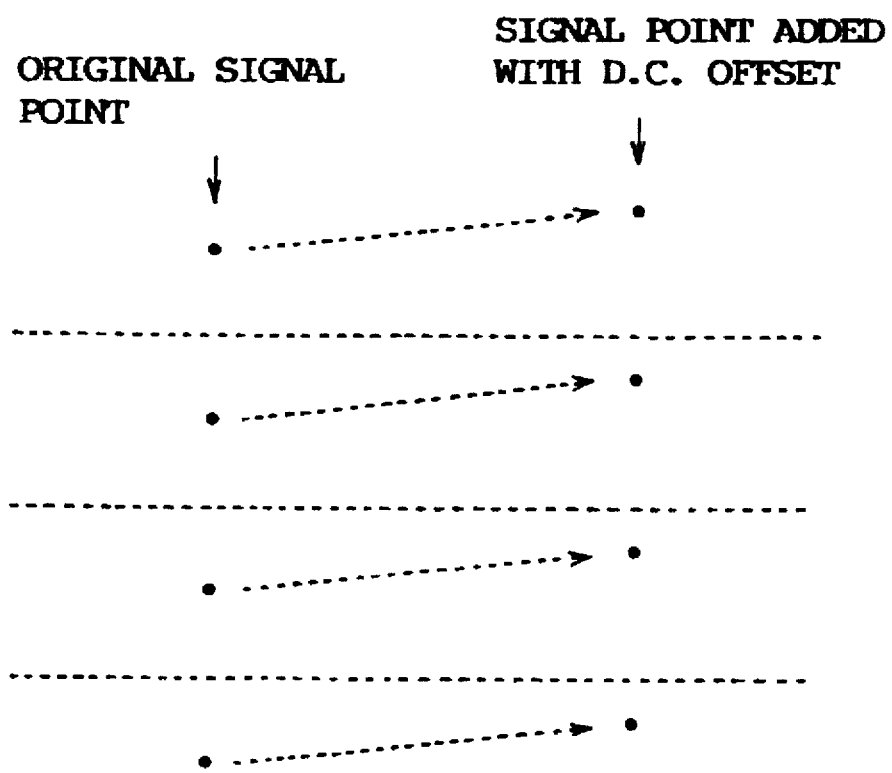
FIG. 11 is a diagram showing a D.C. offset multiplxed to a baseband signal on the side of the differing polarized wave.

FIG. 10 shows the second embodiment, and in FIG. 10, those parts which have the same function and construction as those corresponding parts in FIG. 6 are designated by the same reference numerals, and a description thereof will be omitted.

This embodiment is characterized in that, in addition to the embodiment shown in FIG. 6, a negative feedback is made from the output of the subtracter $124_1$ to a digital adder (hereinafter simply referred to as an "adder") $64_1$ which is provided on the output side of the subtracter $127_1$ via a switch $61_1$ and an integrator $62_1$, a negative feedback is made from the output of the subtracter $124_2$ to an adder $64_2$ which is provided on the output side of the subtracter $127_2$ via a switch $61_2$ and an integrator $62_2$, and a PN code generator (PN) 63 is arranged between make contacts of the switches $61_1$ and $61_2$. A break contact of the switch $61_1$ is connected to the output of the subtracter $124_1$, and a break contact of the switch $61_2$ is connected to the output of the subtracter $124_2$.

Figure 9:
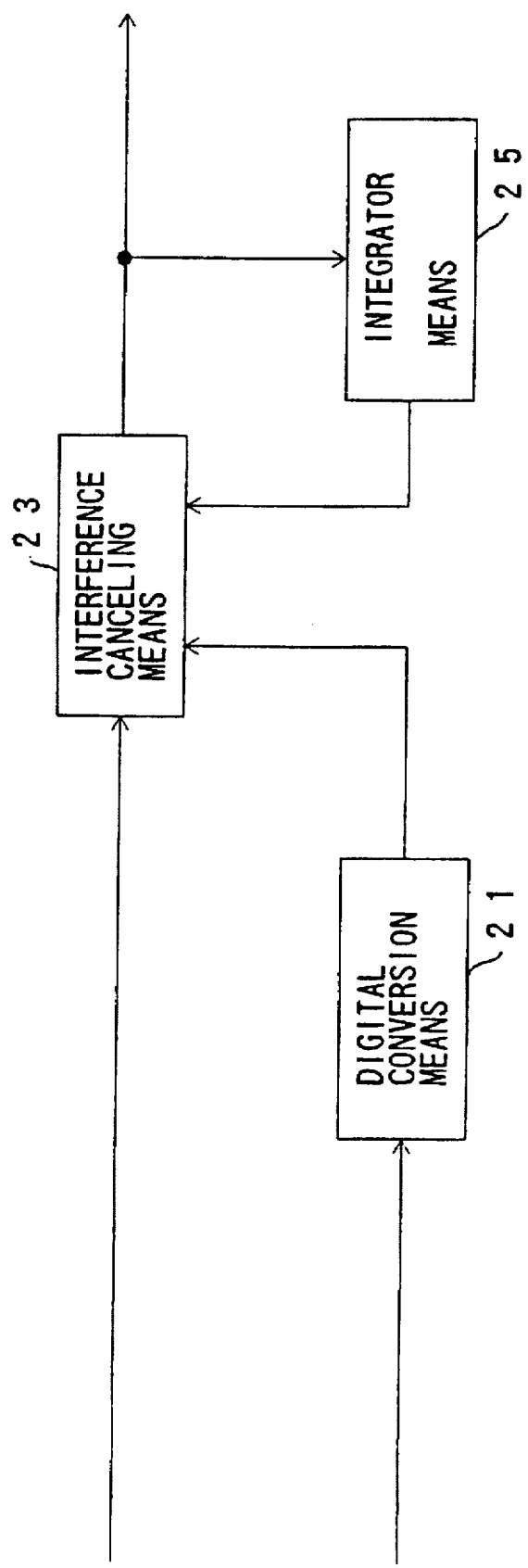
FIG. 9 is a system block diagram for explaining the operating principle of a second embodiment of the cross polarization interference canceler according to the present invention.

With regard to the corresponding relationship between this embodiment and the block diagram shown in FIG. 9, the A/D converters $116_1$ and $116_2$ correspond to the digital conversion means 21, the A/D converters $106_1$ and $106_2$, the transversal filters $122_1$ through $122_4$, the subtracters $123_1$, $123_2$, $124_1$ and $124_2$, the integrators $31_1$ and $31_2$, the amplifiers $107_1$ and $107_2$, the transversal filters $126_1$ through $126_4$ and the subtracters $127_1$ and $127_2$ correspond to the interference canceling means 23, and the integrators $62_1$ and $62_2$ and the adders $64_1$ and $64_2$ correspond to the integrator means 25.

The operation of this embodiment will now be described. The two analog baseband signals obtained from the first and second differing polarization input terminals are converted into the digital baseband signals via the respective amplifiers $117_1$ and $117_2$ and the respective A/D converters $116_1$ and $116_2$. These digital baseband signals are include the D.C. offsets which are introduced during the digital conversion processes carried out by the A/D converters $116_1$ and $116_2$ as shown in FIG. 11, and are transmitted to the outputs of the respective subtracters $124_1$ and $124_2$ via the respective transversal filters $126_1$ and $126_3$ and the respective subtracters $127_1$ and $127_2$.

In a state where no cross reset is carried out, a negative feedback path is formed from the output of the subtracter $124_1$ to the input end of the subtracter $124_1$ via the switch $61_1$ and the integrator $62_1$, and a negative feedback path is formed from the output of the subtracter $124_2$ to the input end of the subtracter $124_2$ via the switch $61_2$ and the integrator $62_2$. Accordingly, the D.C. offsets included in the digital baseband signals output from the A/D converters $116_1$ and $116_2$ are suppressed.

With regard to the signals which are fed back to the inputs of the subtracters $124_1$ and $124_2$ via the respective adders $64_1$ and $64_2$, these signals are suppressed of the interferences of the differing polarized waves by the subtracters $124_1$ and $124_2$, and thus, the distribution of the signal points in the signal space diagram may be treated as a normal distribution. Accordingly, the method of carrying out the integration processes in the integrators $62_1$ and $62_2$ may be the moving average method used in the integrators $31_1$ and $31_2$ or a method similar thereto.

On the other hand, in a state where the cross reset is carried out, the operation of the subtracters $127_1$ and $127_2$ stops and the output signals of these subtracters $127_1$ and $127_2$ assume a constant logic value. The inputs of the integrators $62_1$ and $62_2$ are connected to the output of the PN code generator 63 via the respective switches $61_1$ and $61_2$. The PN code which is set by the PN code generator 63 has a duty ratio which is approximately uniform, and is fed back to the inputs of the adders $64_1$ and $64_2$ via the respective integrators $62_1$ and $62_2$.

In other words, even in the cross reset state, the D.C. offset will not shift greatly as indicated by "3" in FIG. 4. Accordingly, no large transient response occurs when clearing the cross reset state, and it is possible to promptly return to the above steady state in which the D.C. offsets are suppressed.

Therefore, according to this embodiment, the D.C. offsets generated at the A/D converters $116_1$ and $116_2$ are suppressed, and the identification error of each word conventionally generated due to the D.C. offsets is greatly reduced.

Any signal having an average value which is approximately one-half the amplitude value, such as a clock signal having a duty ratio of 50%, for example, may be used as the above PN code.

Figure 12:
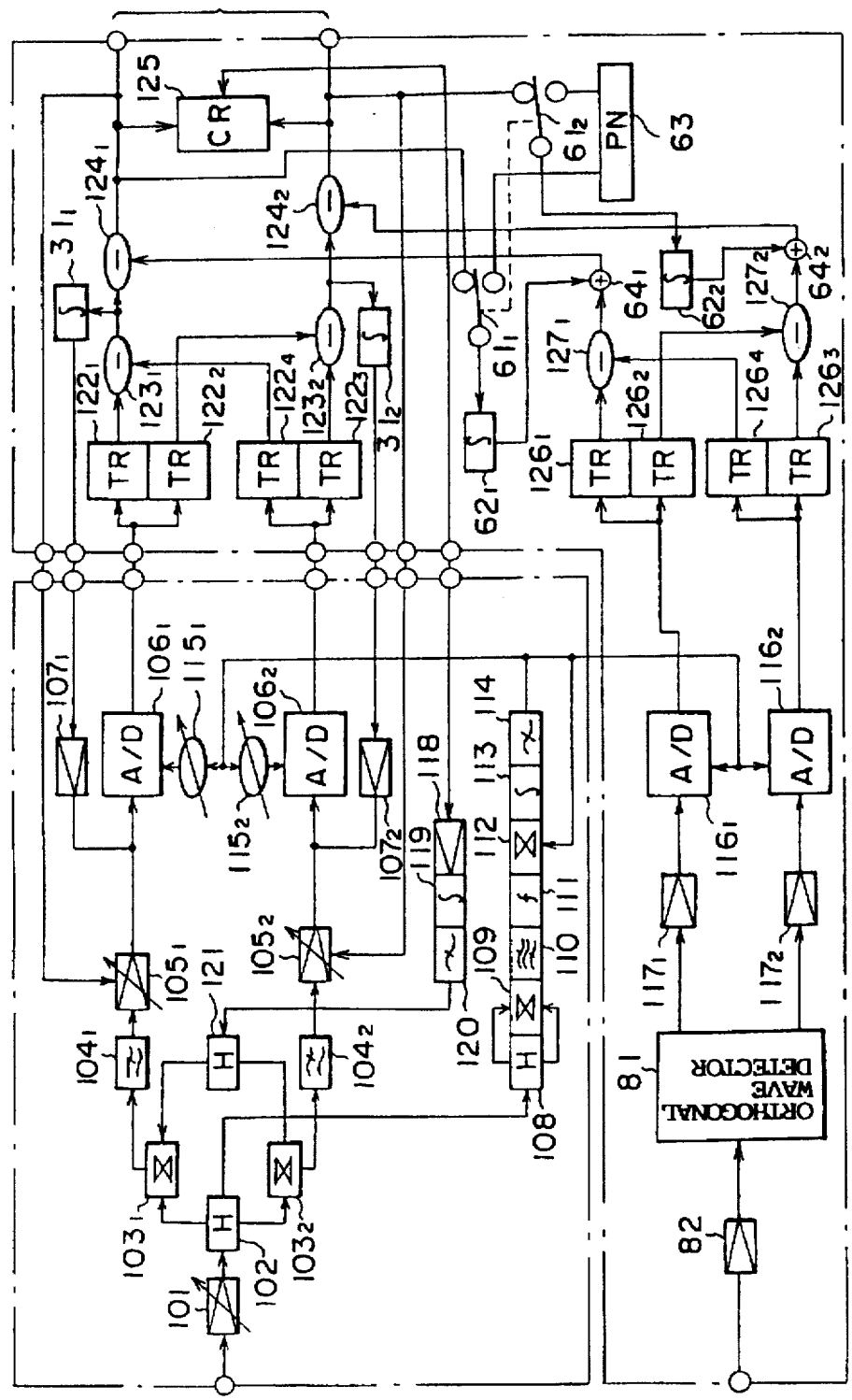
FIG. 12 is a system block diagram showing a third embodiment of the cross polarization interference canceler according to the present invention.

FIG. 12 is a diagram showing a third embodiment of the cross polarization interference canceler according to the present invention. In FIG. 12, those parts which have the same function and construction as those corresponding parts shown in FIG. 10 are designated by the same reference numerals, and a description thereof will be omitted.

This embodiment is characterized in that, an orthogonal wave detector 81 is provided at a stage prior to the amplifiers $117_1$ and $117_2$, and further, a variable gain amplifier 82 for amplifying an interference wave to a predetermined level is provided at a stage prior to the orthogonal wave detector 81.

A description will now be given of the operation of this embodiment. In this embodiment, the operating principle described in conjunction with FIG. 9 is applied to a VCDIC (Vector Compensated Detect Interference Canceller) which carries out a FM interference elimination. Since the operation of this embodiment is essentially the same as that of the second embodiment shown in FIG. 10, a description thereof will be omitted.

In FIG. 12, the interference wave with respect to the input signal applied to the AGC amplifier 101 is supplied to the orthogonal wave detector 81 via a predetermined antenna system and the variable gain amplifier 82. The orthogonal wave detector 81 generates two orthogonal baseband signals by demodulating this interference wave, and apply the two orthogonal baseband signals to the A/D converters $116_1$ and $116_2$ via the respective amplifiers $117_1$ and $117_2$. Accordingly, the subtracters $124_1$ and $124_2$ carry out the process of eliminating the interference wave component included in the above intermediate frequency signals.

In each of the above embodiments, the received wave corresponding to each polarized wave has been subjected to the QAM, and the quadrature demodulation which is carried out is adapted to the modulation technique. However, the present invention is not limited to such a modulation technique, and for example, the present invention is similarly applicable to a 2-phase PSK modulation technique.

In addition, each of the above embodiments carry out the process of compensating for the quadrature errors of the quadrature demodulations made by the multipliers $103_1$ and $103_2$ via the transversal filters $122_2$ and $122_4$ and the subtracters $123_1$ and $123_2$, and carry out the process of compensating for the distortion of the transmission path via the transversal filters $122_1$ and $122_3$. However, the present invention is also applicable to a receiver apparatus which does not carry out such compensation processes.

As described above, according to the cross polarization interference canceler of the present invention, a negative feedback path for suppressing the D.C. offset accompanying the digital conversion of the demodulated signal subject to the interference canceling is formed at a stage prior to the interference canceling means which cancels the interference between the channels adapted to the differing polarization sharing system, so that the D.C. offset is stably suppressed even in a state where the demodulated signal corresponding to the interference wave is not given. In addition, by making the negative feedback of the D.C. offset accompanying the digital conversion of the demodulated signal of the interference wave to the interference canceling means, it is possible to suppress transmission of the D.C. offset with respect to the output end of the interference canceling means. In other words, the D.C. offset included in the demodulated signal which is obtained by carrying out the interference canceling process is stable and positively suppressed compared to the conventional example regardless of whether the demodulated signal of the interference wave is given. Hence, it is possible to reduce the probability of generating the identification error caused by the D.C. offset, and the performance of the receiver apparatus corresponding to the differing polarization sharing system.

In the cross polarization interference canceler shown in FIG. 2 or the like, the D.C. drift components of the main signal (demodulated signal) caused by the D.C. offsets of the A/D converters $106_1$ and $106_2$ on the side of the demodulator are remedied by the above described drift control (negative feedback) of the main signal, and the D.C. offsets of the A/D converters $116_1$ and $116_2$ on the side of the cross polarization interference canceler are remedied by the drift control with respect to the main signal. However, if for some reason the reference carrier signal generated in the demodulator on the side of the differing polarized wave becomes non-synchronous to the received wave of the corresponding polarized wave, the cross reset is carried out to stop the function of the cross polarization interference canceler corresponding to the polarized wave opposite to the received wave. However, when this cross reset is carried out, an external disturbance is introduced in the drift control with respect to the main signal, and an error may be generated in the main signal.

Figure 13:
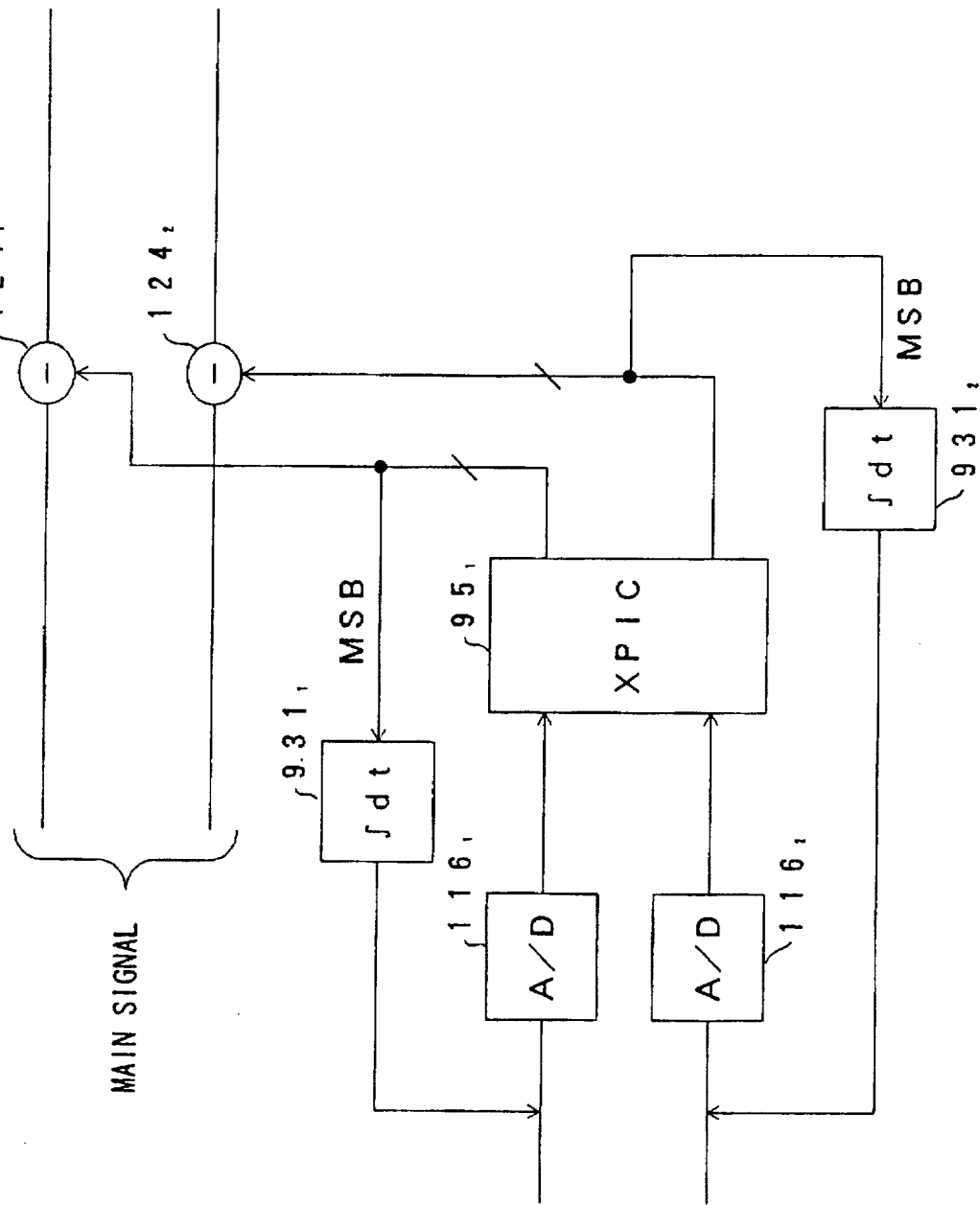
FIG. 13 is a system block diagram for explaining the problems of independently carrying out the drift control on the side of the cross polarization interference canceler.

Accordingly, it is conceivable to eliminate the above described inconvenience by carrying out the drift control on the side of the cross polarization interference canceler independently of the drift control with respect to the main signal. FIG. 13 shows an important part of a circuit which carries out this conceivable drift control. In FIG. 13, those parts which are the same as those corresponding parts in FIG. 2 are designated by the same reference numerals, and a description thereof will be omitted.

In the circuit shown in FIG. 13, the most significant bit (MSB) of one output signal from the subtracter $127_1$ of the XPIC $95_1$ is fed back to the A/D converter $116_1$ via an integrator $931_1$. Similarly, the MSB of the other output signal from the subtracter $127_2$ of the XPIC $95_1$ is fed back to the A/D converter $116_2$ via an integrator $931_2$. However, since the two D.C. offsets are included in each compensation signal in this case, the drift control on the side of the XPIC $95_1$ cannot be carried out appropriately by the method which feeds back each compensation signal to only one corresponding A/D converter $116_1$ or $116_2$.

Hence, a description will next be given of an embodiment which eliminates the above inconvenience by carrying out the drift control on the side of the XPIC independently of the drift control with respect to the main signal.

Figure 14:
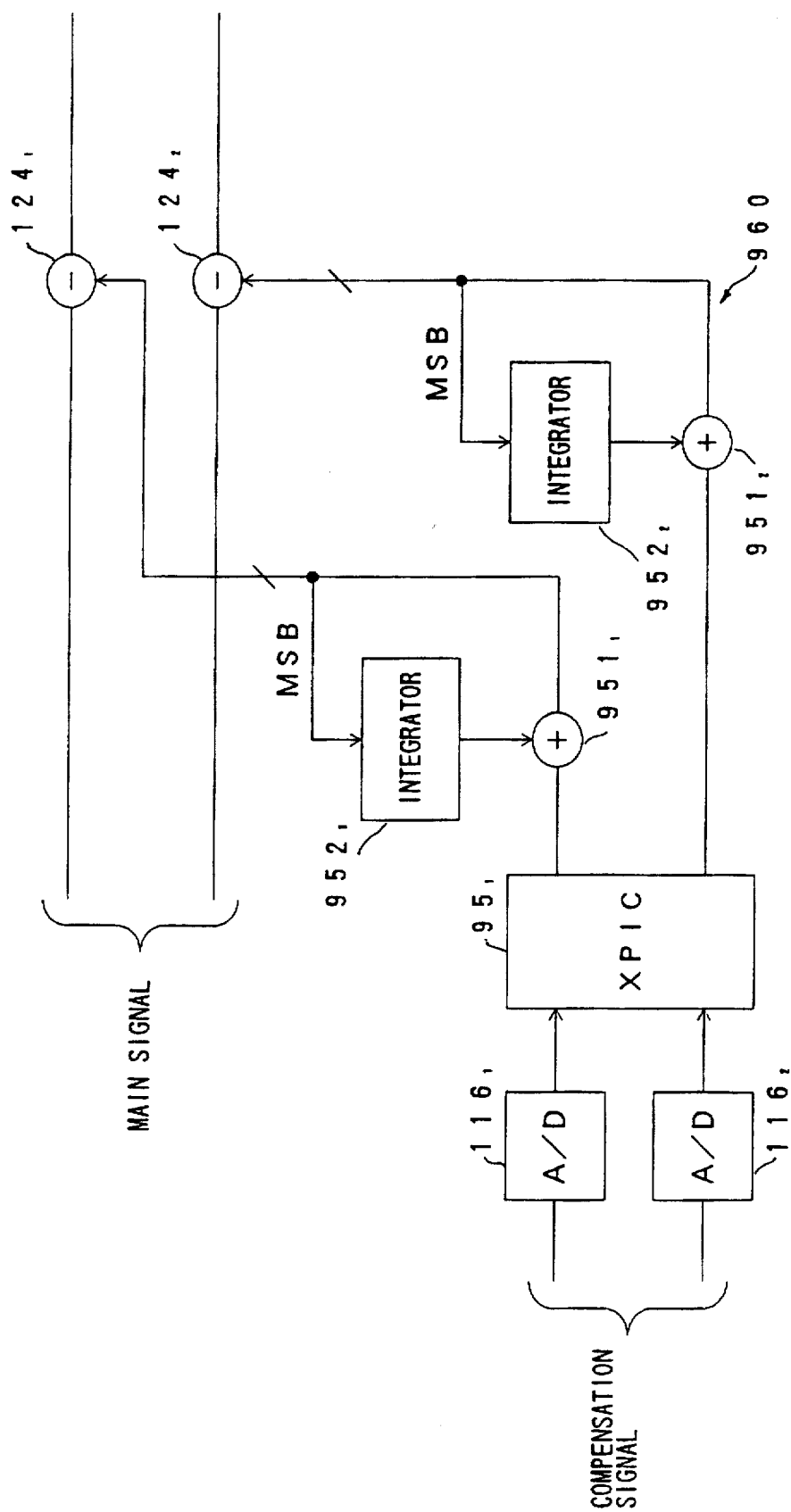
FIG. 14 is a system block diagram showing an important part of a fourth embodiment of the cross polarization interference canceler according to the present invention.

FIG. 14 shows a fourth embodiment of the cross polarization interference canceler according to the present invention. In FIG. 14, those parts which are the same as those corresponding parts in FIG. 2 are designated by the same reference numerals, and a description thereof will be omitted.

In this embodiment, a drift controller 960 made up of adders $951_1$ and $951_2$ and integrators $952_1$ and $952_2$ is provided with respect to the XPIC $95_1$. Accordingly, the signals from the subtracters $127_1$ and $127_2$ of the XPIC $95_1$ are subjected to the drift control in the drift controller 960, independently of the drift control with respect to the main signal, before being supplied to the respective subtracters $124_1$ and $124_2$.

The signal from the subtracter $127_1$ of the XPIC $95_1$ is supplied to the subtracter $124_1$ via the adder $951_1$, and the MSB of this signal is integrated in the integrator $952_1$ before being supplied to the adder $951_1$. Similarly, the signal from the subtracter $127_2$ of the XPIC $95_1$ is supplied to the subtracter $124_2$ via the adder $951_2$, and the MSB of this signal is integrated in the integrator $952_2$ before being supplied to the adder $951_2$. In other words, since this embodiment carries out the drift control on the output side of the XPIC $95_1$, it is possible to carry out an appropriate drift control on the side of the XPIC $95_1$, independently of the drift control with respect to the main signal, even though the two D.C. offsets are included in each compensation signal.

When the reference carrier signal generated by the demodulator on the side of the differing polarized wave is synchronized to the received wave of the corresponding polarized wave, the eye-patterns of the baseband signals obtained at the output ends of the subtracters $124_1$ and $124_2$ may become open, and in such a case, it may not be possible to carry out an appropriate drift control by integrating the MSBs at the integrators $952_1$ and $952_2$. For this reason, it is desirable to use as the integrators $952_1$ and $952_2$ an integrator which obtains the moving average.

Figure 15:
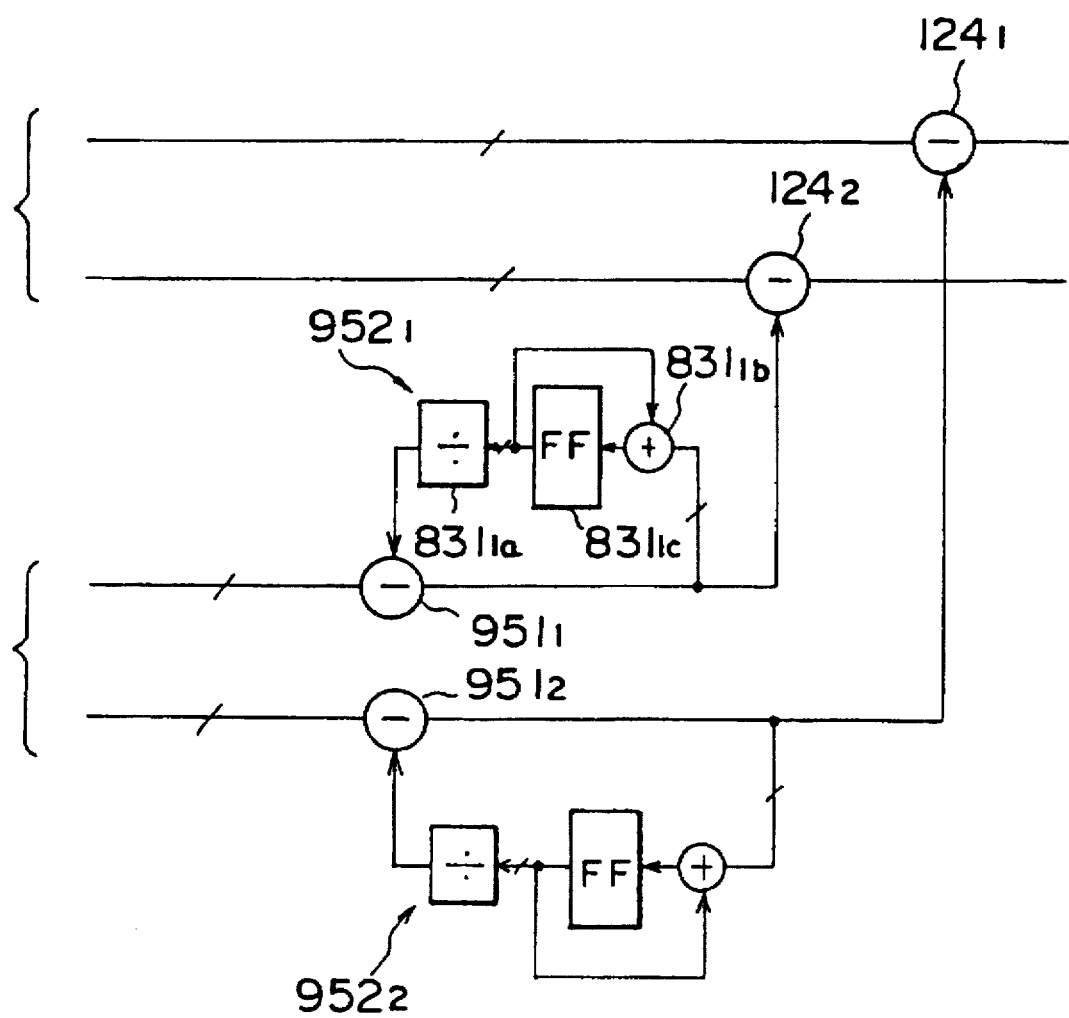
FIG. 15 is a system block diagram for explaining a moving average method.

When obtaining the average value by the moving average method in the integrators $952_1$ and $952_2$ shown in FIG. 14, it is possible to use the construction shown in FIG. 15.

In FIG. 15, the integrator $952_1$ is made up of an adder $831_{1b}$, a flip-flop $831_{1c}$, and a divider $831_{1d}$. The adder $831_{1b}$ and the flip-flop $831_{1c}$ multiply the logic values of the MSBs of the data obtained via the subtracter $951_1$. The divider $831_{1d}$ obtains the drift by dividing the above multiplication result for every predetermined number of consecutive words. The subtracter $951_1$ carries out a subtraction between the input data thereto and the drift obtained from the divider $831_{1d}$, and as a result obtains the moving average for every predetermined number of words of the data. The construction and operation of the integrator $952_2$ are the same as those of the integrator $952_1$, and a description thereof will be omitted.

As digital radio communication systems which use the carrier in the microwave band, mass digital radio communication systems using a highly efficient multi-value modulation system such as the 16-value quadrature amplitude modulation (16 QAM) have become popular. In such a digital radio communication system, the number of multi-values of the multi-value modulation is increased and the co-channel transmission system using the cross polarization is employed in order to improve the frequency utilization efficiency. Hence, if a phasing or the like occurs, one polarized wave leaks to the other polarized wave to thereby cause the cross polarization interference. Accordingly, in order to reduce such a cross polarization interference and to satisfy a predetermined digital line standard, a cross polarization interference eliminating apparatus is provided within the receiver apparatus.

On the other hand, helped by the recent and rapid progress of the integration circuit technology, a quasi-synchronous detection system which is suited for reducing the size of the apparatus and eliminating the need for adjustments is more and more applied to the receiver apparatus. Hence, the receiver apparatus employing such a quasi-synchronous detection system must also be provided with the above cross polarization interference eliminating apparatus, but in this case the following problems occur as described hereunder.

Figure 16:
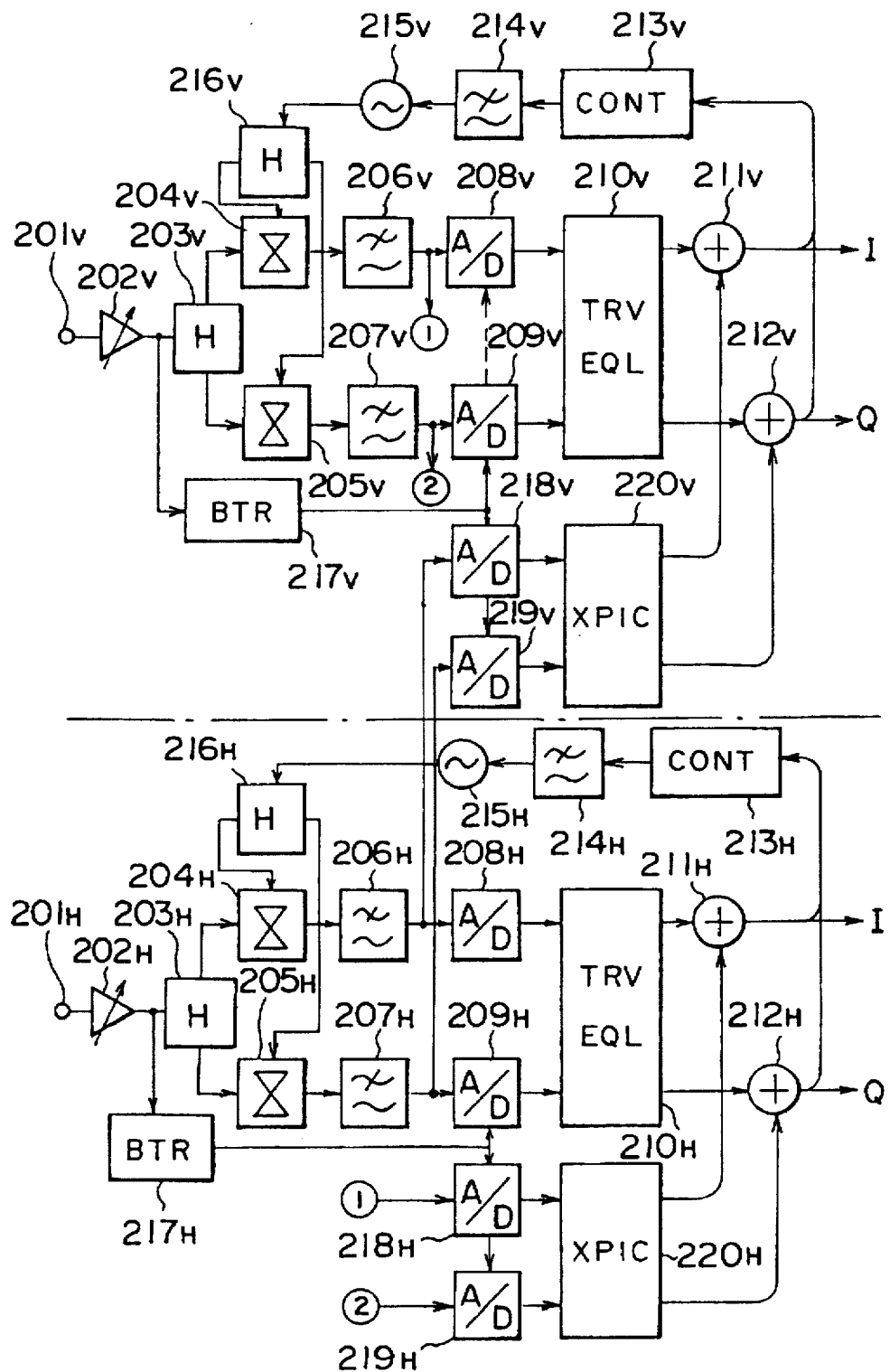
FIG. 16 is a system block diagram showing an example of a conventional cross polarization interference eliminating apparatus.

FIG. 16 is a diagram showing the construction of an example of a conventional cross polarization interference eliminating apparatus. In FIG. 16, a subscript V is added to the numerals used in a vertical polarization signal reproducing system, and a subscript H is added to the numerals used in a horizontal polarization signal reproducing system. In addition, the same numerals are used for the corresponding circuit parts of the vertical polarization (V polarization) reproducing system and the horizontal polarization (H polarization) reproducing system. A local oscillator for IF on the transmitting side and a local oscillator for microwave are synchronized between the V and H polarizations.

A V polarization signal and a H polarization signal in the intermediate frequency (IF) band separated and converted from corresponding received signals are input to respective terminals $201_V$ and $201_H$. The polarization signals are passed through respective AGC amplifiers $202_V$ and $202_H$ and respective hybrids $203_V$ and $203_H$, and supplied to respective mixers $204_V$ and $205_H$ and mixers $204_H$ and $205_H$. Hence, these signals are subjected to frequency conversions with the signals from hybrids $216_V$ and $216_H$ which will be described later.

Accordingly, V polarization baseband signals obtained from the mixers $204_V$ and $205_V$ are subjected to wave shaping in respective lowpass filters $206_V$ and $207_V$, and are thereafter supplied to respective A/D converters $208_V$ and $209_V$ and subjected to analog-to-digital conversions so as to identify the data. Similarly, H polarization baseband signals obtained from the mixers $204_H$ and $205_H$ are supplied to respective A/D converters $208_H$ and $209_H$ via respective lowpass filters $206_H$ and $207_H$.

Figure 17:
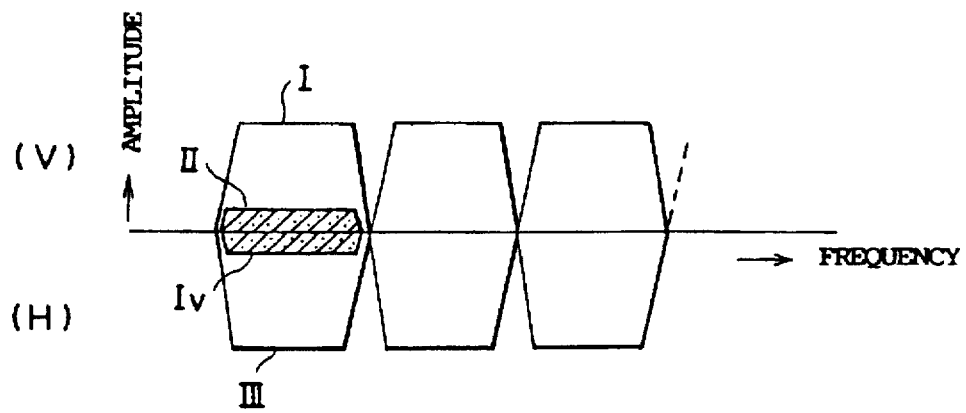
FIG. 17 is a diagram for explaining the cancellation of the cross polarization interference.

Digital signals obtained from the A/D converters $208_V$ and $209_V$ are supplied to a transversal equalizer $210_V$ wherein a waveform equalization is made, and then supplied to adders $211_V$ and $212_V$. If the frequency spectrum of the IF signal of the V polarization input to the terminal $201_V$ is as indicated by I in FIG. 17, the H polarization signal component indicated by II in FIG. 17 is leaked within this IF signal. Similarly, if the frequency spectrum of the IF signal of the H polarization input to the terminal $201_H$ is a indicated by III in FIG. 17, the H polarization component indicated by IV in FIG. 17 is leaked within this IF signal.

Hence, the two output signals of the lowpass filters $206_H$ and $207_H$ are converted into digital signals in respective A/D converters $218_V$ and $219_V$, and thereafter supplied to a cross polarization interference canceler (XPIC) $220_V$. The XPIC $220_V$ generates an interference canceling signal corresponding to the amount of interference of the H polarization component included as the interference component within the demodulated signal of the V polarization signal. This interference canceling signal is further supplied to each of adders $211_V$ and $212_V$. As a result, the interference wave components included in the demodulated data of the V polarization signal obtained from the transversal equalizer $210_V$ are mutually cancelled in the adders $211_V$ and $212_V$, and are thereafter output as an in-phase signal (I-signal) and a quadrature signal (Q-signal).

Furthermore, the above demodulated I-signal and demodulated Q-signal are passed through a control circuits $213_V$ and a lowpass filter $214_V$ and applied to a voltage controlled oscillator (VCO) $215_V$ to variably control the output oscillation frequency thereof. The output oscillation frequency of this VCO $215_V$ is supplied to each of the mixers $204_V$ and $205_V$.

A clock signal which is extracted by a clock reproducing circuit (BTR circuit) $217_V$ from the V polarization IF signal which is obtained from the AGC amplifier $202_V$ is used as the clock to each of the A/D converters $208_V$, $209_V$, $218_V$ and $219_V$, so that these converters operate in synchronism with each other.

Similarly, the V polarization signal components included as interference wave components within the demodulated data of the H polarization signal obtained from the transversal equalizer $210_H$ are mutually cancelled in the adders $211_H$ and $212_H$ with the interference canceling signal from the XPIC $220_H$ and are thereafter output as the I-signal and the Q-signal.

In this conventional cross polarization interference eliminating apparatus, the reference signal which is input to the A/D converters $218_V$ and $219_V$ (or $218_H$ and $219_H$) is synchronized to the interference wave component included in the baseband signal of the V polarization signal (or H polarization signal) on the side of the main signal. Hence, the XPIC $220_V$ ($220_H$) can generate the interference canceling signal for canceling this interference wave component.

However, according to the quasi-synchronous detection system, the reference signal input to the A/D converters $218_V$ and $219_V$ (or $218_H$ and $219_H$) has a phase plane which rotates at a frequency difference $\Delta f_2$ of the transmission and reception described by the following formula (1). In the formula (1), $f_{1F}$ denotes the transmitting intermediate frequency, $f_\mu$ denotes the transmitting local oscillation frequency, $f_{R2}$ denotes the H polarization receiving local receiving local oscillation frequency, and $f_2$ denotes the H polarization receiving intermediate frequency.

$$\Delta f_2 = (f_{1F} + f_\mu) - (f_{R2} + f_2) \tag{1}$$

On the other hand, the reference signal input to the A/D converters $208_V$ and $209_V$ (or $208_H$ and $209_H$) has a phase plane which rotates at a frequency difference $\Delta f_1$ of the transmission and reception described by the following formula (2). In the formula (2), $f_{R1}$ denotes the V polarization receiving local receiving local oscillation frequency, and $f_1$ denotes the V polarization receiving intermediate frequency.

$$\Delta f_1 = (f_{1F} + f_\mu) - (f_{R1} + f_1) \tag{2}$$

Here, $f_{R1} \neq f_{R2}$ and $f_1 \neq f_2$, and the phases of the reference signal and the main signal are not synchronized. Hence, it is not possible to generate in the XPIC $220_V$ (and $220_H$) an interference canceling signal which cancels the interference wave component.

Hence, a description will next be given of a cross polarization interference eliminating apparatus according to the present invention which may also be applied with the quasi-synchronous detection system.

Figure 18:
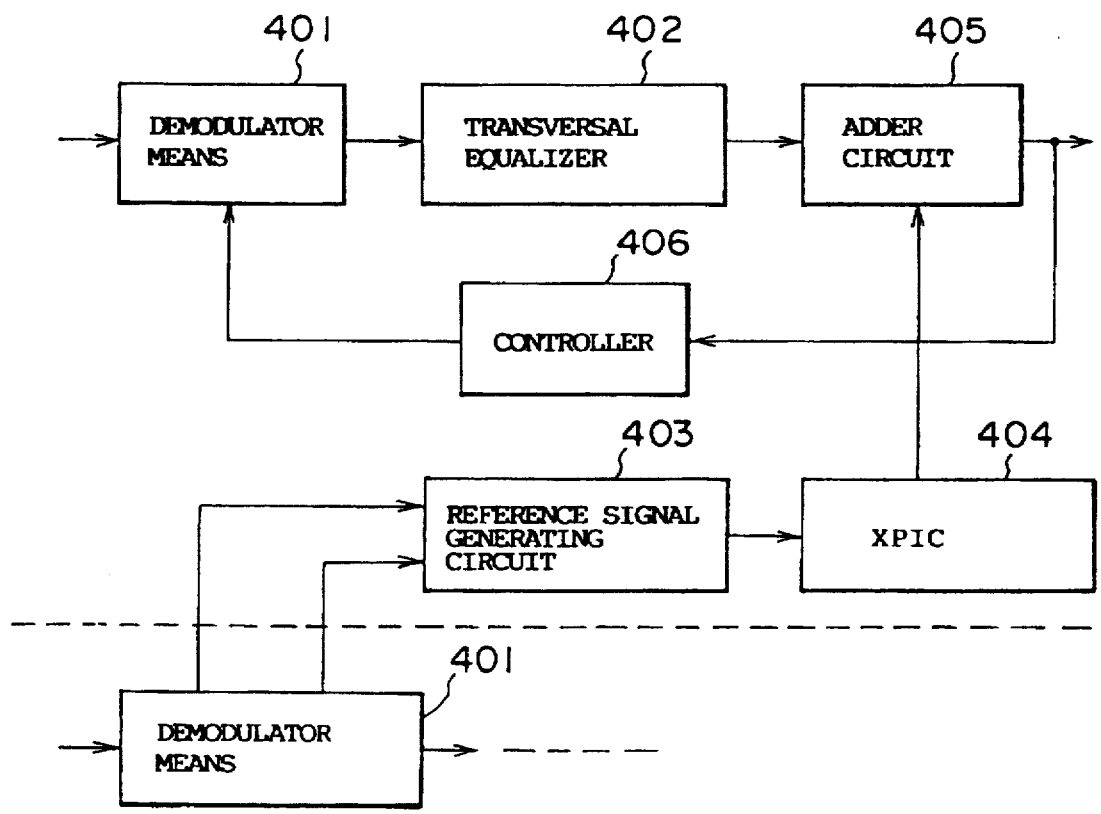
FIG. 18 is a system block diagram for explaining the operating principle of a cross polarization interference eliminating apparatus according to the present invention.

First, a description will be given of the operating principle of the cross polarization interference eliminating apparatus according to the present invention, by referring to FIG. 18. In FIG. 18, a demodulator means 401 independently demodulates first and second polarized waves received and having the cross polarization relationship according to the quasi-synchronous detection system. A transversal equalizer 402 carries our a waveform equalization with respect to output demodulated data of the demodulating means 401. A reference signal generating circuit 403 generates a reference signal which is eliminated of the phase rotation, from phase rotation control information and baseband signal obtained from a part of the demodulating means 401 on the side of the other polarized wave.

A cross polarization interference canceler 404 generates an interference canceling signal corresponding to the interference wave component included in the output demodulated data of the demodulator means 401 from the reference signal obtained from the reference signal generating circuit 403. An adder circuit 405 adds the output interference canceling signal of the cross polarization interference canceler 404 to the output demodulated data of the transversal equalizer 402, and outputs demodulated in-phase signal and quadrature signal.

A controller 406 generates a phase rotation control signal from the above in-phase signal and the quadrature signal, and feeds back this phase rotation control signal to the demodulator means 401. The above demodulator means 401, the transversal equalizer 402, the reference signal generating circuit 403, the cross polarization interference canceler 404, the adder circuit 405 and the controller 406 are independently provided with respect to each of the first polarized wave and the second polarized wave.

According to the quasi-synchronous detection system, the demodulator means 401 generates the demodulated baseband signal using a certain local oscillation frequency which is slightly different from the input intermediate frequency. As described above, the phase plane of this demodulated baseband signal rotates at the frequency $\Delta f_1$. Hence, the phase plane of the baseband signal input to the reference signal generating circuit 403 from the demodulator means on the side of the other polarized wave similarly rotates at the frequency $\Delta f_2$.

However, according to the quasi-synchronous detection system, the demodulator means 401 on the side of the one polarized wave eliminates the rotation of the phase plane of the above $\Delta f_2$ from the baseband signal by a digital signal processing. For this reason, the demodulated data input from the demodulator means 401 to the transversal equalizer 402 have no phase rotation as in the case of the demodulated data obtained in the conventional cross polarization interference eliminating apparatus.

On the other hand, if the baseband signal obtained from within the demodulator means 401 on the side of the other polarized wave is input as it is as the reference signal to the cross polarization interference canceler 404 in order to cancel the interference wave component, the phase rotation occurs in the interference canceling signal. Hence, the present invention provides the reference signal generating circuit 403 which generates the baseband signal which is eliminated of the phase rotation based on the phase rotation control information and the baseband signal obtained from a part of the demodulator means 401 on the side of the other polarized wave, that is, generates the reference signal, and this reference signal is input to the cross polarization interference canceler 404.

Therefore, it is possible to make the interference wave component from the side of the other polarized wave leaking within the demodulated data obtained from the transversal equalizer 402 and the interference canceling signal from the cross polarization interference canceler 404 become synchronized signals.

Figure 19:
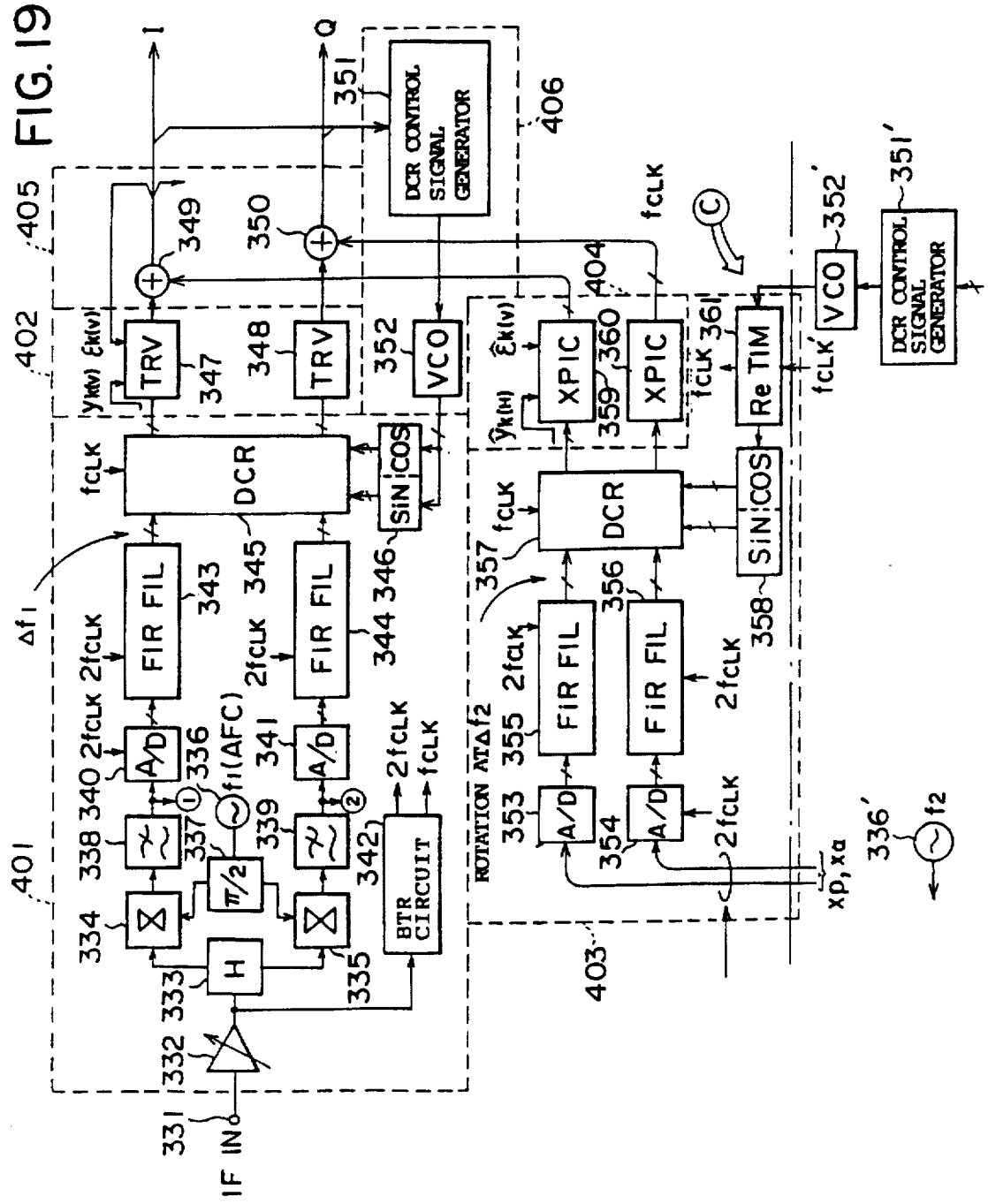
FIG. 19 is a system block diagram showing a first embodiment of the cross polarization interference eliminating apparatus.

FIG. 19 shows the construction of a first embodiment of the cross polarization interference eliminating apparatus according to the present invention. In FIG. 19, those parts which are the same as those corresponding parts in FIG. 18 are designated by the same reference numerals, and a description thereof will be omitted. Since a H polarization demodulating system and a V polarization demodulating system have the same construction, only the construction of one polarization demodulating system and a part of the other polarization demodulating system are shown in FIG. 19 for the sake of convenience.

In FIG. 19, one polarization signal out of the received V polarization and H polarization which are transmitted in the co-channel transmission system and received is converted into the IF band and input to a terminal 331. The amplitude of this polarization signal of the IF band is controlled to a predetermined value by an AGC amplifier 332, and is input to mixers 334 and 335 via a hybrid 333. On the other hand, a frequency $f_1$ which slightly differs from the intermediate frequency is fixedly output from an oscillator 336 as a received IF local oscillation frequency. This local oscillation frequency is supplied directly to the mixer 334 on one hand, and is supplied to the mixer 335 on the other after being phase-shifted by $\pi/2$ in a $\pi/2$ phase shifter 337. Accordingly, baseband signals are respectively obtained from the mixers 334 and 335. The baseband signals are supplied to respective lowpass filters 338 and 339 for eliminating the aliasing noise, and frequency components predetermined cutoff frequencies (for example, $f_{CLK}$) or greater are eliminated. Then, the baseband signals are input to respective A/D converters 340 and 341 wherein these signals are subjected to analog-to-digital conversions based on one polarization signal clock having a frequency $2f_{CLK}$. The above one polarization signal clock $2f_{CLK}$ is for example a clock which is synchronized to a clock $f_{CLK}$ which is extracted and reproduced from the output IF signal of the AGC amplifier 332 by a clock reproducing circuit (BTR circuit) 342 and has twice the frequency of $f_{CLK}$, and is generated and output from the BTR circuit 342.

Output demodulated data of the A/D converters 340 and 341 are given roll-off characteristics in respective finite impulse response (FIR) digital filter 342 and 343 which operate in response to the clock $2f_{CLK}$, and are thereafter supplied to a phase rotation circuit (DCR) 345. The phase rotation circuit 345 is a known circuit which cancels the phase rotation of the frequency $\Delta f_1$ of the input demodulated data by a digital signal processing based on the clock $f_{CLK}$ and a phase rotation control signal from a circuit 346.

A circuit part from the above AGC amplifier 332 to the above phase rotation circuit 345 corresponds to the demodulator means 401 of the quasi-synchronous detection system, and the demodulated data eliminated of the phase rotation and obtained from the phase rotation circuit 345 are subjected to waveform shaping in respective transversal filters 347 and 348 which form the above transversal equalizer 402. The shaped demodulated data are thereafter supplied to respective adders 349 and 350 which form the above adder circuit 405.

On the other hand, the received IF local oscillation frequency output from an oscillator 336' within the demodulator means 410 on the side of the other polarized wave is $f_2$. In addition, the baseband signals branched and obtained from lowpass filters 338' and 339' (not shown) corresponding to the above lowpass filters 338 and 339 are supplied to respective A/D converters 353 and 354 where analog-to-digital conversions are carried out based on the other polarization signal clock $2f_{CLK}$. Output data of the A/D converters 353 and 354 are given roll-off characteristics in FIR digital filters 355 and 356, and are thereafter supplied to a phase rotation circuit (DCR) 357. The phase rotation circuit 357 cancels the phase rotation of the above frequency $\Delta f_2$ of the input data by a digital signal processing based on the other polarization signal clock $f_{CLK}$ and a phase rotation control signal from a circuit 358 which will be described later.

A phase rotation control signal indicating the same phase rotation as the baseband signal on the side of the other polarized wave is supplied from a DCR control signal generator 351' on the side of the other polarized wave to a timing circuit 361 via a voltage controlled oscillator (VCO) 352'. This retiming circuit 361 is made up of a first-in-first-out (FIFO) memory, for example, and writes the input phase rotation control signal responsive to the other polarization signal clock $f_{CLK'}$, reads responsive to the one polarization signal clock $f_{CLK}$ and supplies the read signal to a signal generating circuit 358. Accordingly, the phase rotation signal from the signal generating circuit 358 is synchronized to the one polarization signal clock $f_{CLK}$, and the phase rotation of the baseband signal on the side of the other polarized wave is eliminated based on the one polarization signal clock and obtained as the reference signal.

On the other hand, the interference wave components from the side of the other polarized wave included within the output demodulated data of the phase rotation circuit 345 are synchronized to the one polarization signal clock $f_{CLK}$, and the reference signals obtained from the phase rotation circuit 357 become signals which are synchronized to the above interference wave components. The reference signals are converted into interference canceling signals based on known operations of cross polarization interference cancelers 359 and 360 which form the above cross polarization interference canceler 404, and are thereafter supplied to the adders 349 and 350. As a result, demodulated data which are greatly reduced of or eliminated of the interference components, that is, the I-signal and the Q-signal, are obtained from the adders 349 and 350.

In addition, the I-signal and the Q-signal are supplied to the DCR control signal generator 351 to generate the DCR control signal. This DCR control signal is applied to the VCO 352 as a control voltage to variable control the output oscillation frequency thereof. The phase rotation control signal is obtained from the signal generating circuit 346 in synchronism with the output oscillation frequency of the VCO 352 and is supplied to the phase rotation circuit 345. Hence, according to this embodiment, it is possible to approximately eliminate the interference wave components within the demodulated data which are wave-detected by the quasi-synchronous detection system.

Figure 20:
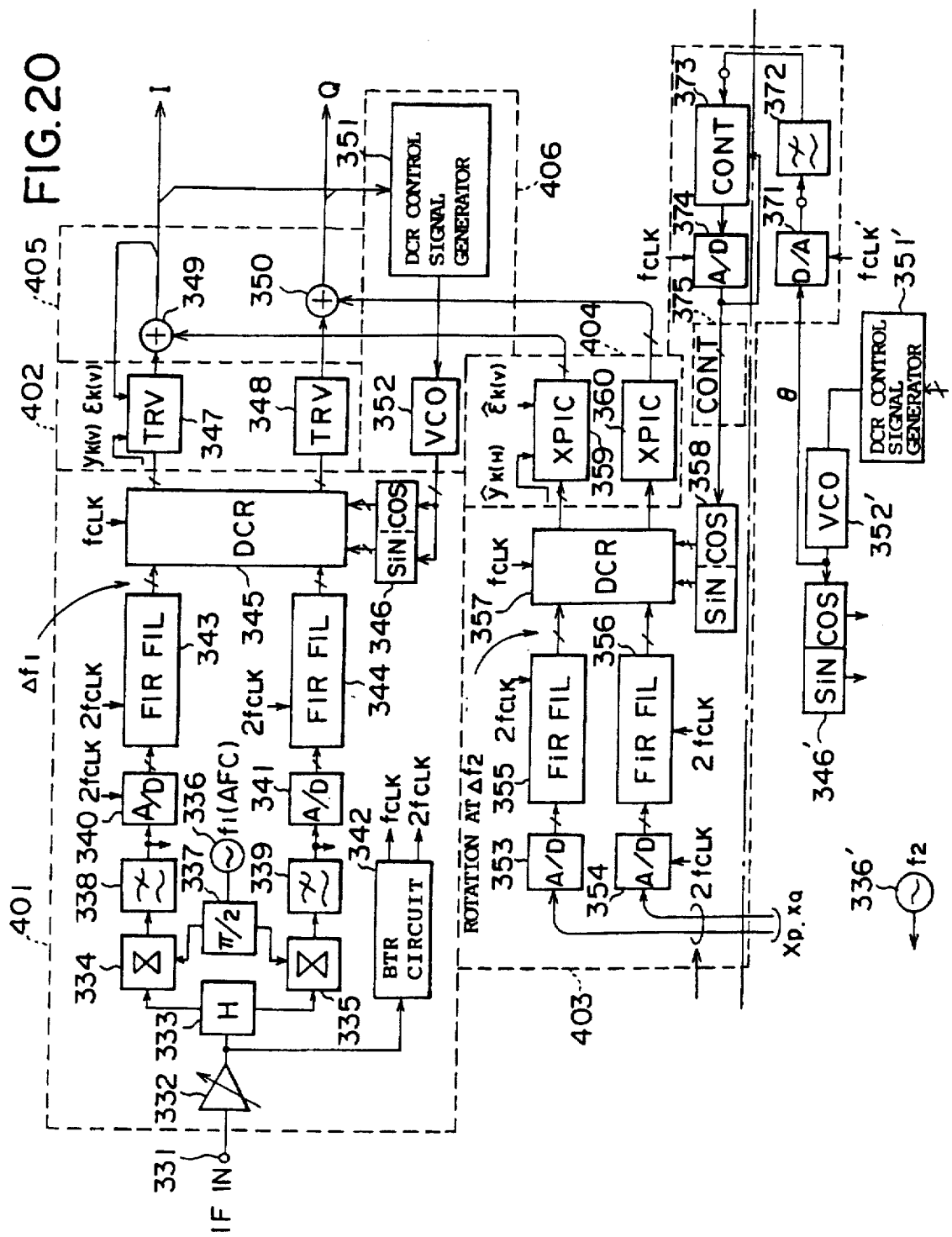
FIG. 20 is a system block diagram showing a second embodiment of the cross polarization interference eliminating apparatus.

FIG. 20 shows the construction of a second embodiment of the cross polarization interference eliminating apparatus according to the present invention. In FIG. 20, those parts which are the same as those corresponding parts in FIGS. 18 and 19 are designated by the same reference numerals, and a description thereof will be omitted. In FIG. 20, the control signal which is obtained from the VCO 352' of the demodulating system on the side of the other polarized wave is subjected to a digital-to-analog conversion in a D/A converter 371 based on the other polarization signal clock $f_{CLK'}$. A continuous analog control signal from this D/A converter 371 is eliminated of unwanted high-frequency components in a lowpass filter 372 before being supplied to a control (CONT) circuit 373.

This control circuit 373 is one of or both an automatic amplitude control circuit shown in FIG. 22 or FIG. 23 which will be described later and an automatic offset control circuit shown in FIG. 24 or FIG. 25 which will be described later. In other words, the control circuit 373 automatically suppresses the amplitude deviation or the offset voltage deviation with respect to the input analog control signal before supplying the input analog control signal to an A/D converter 374 in the next stage. The A/D converter 374 subjects the analog control signal to an analog-to-digital conversion based on the one polarization signal clock $f_{CLK}$ to generate a phase rotation control signal for the one polarized wave, and supplies this phase rotation control signal to the signal generating circuit 358.

Figure 21:
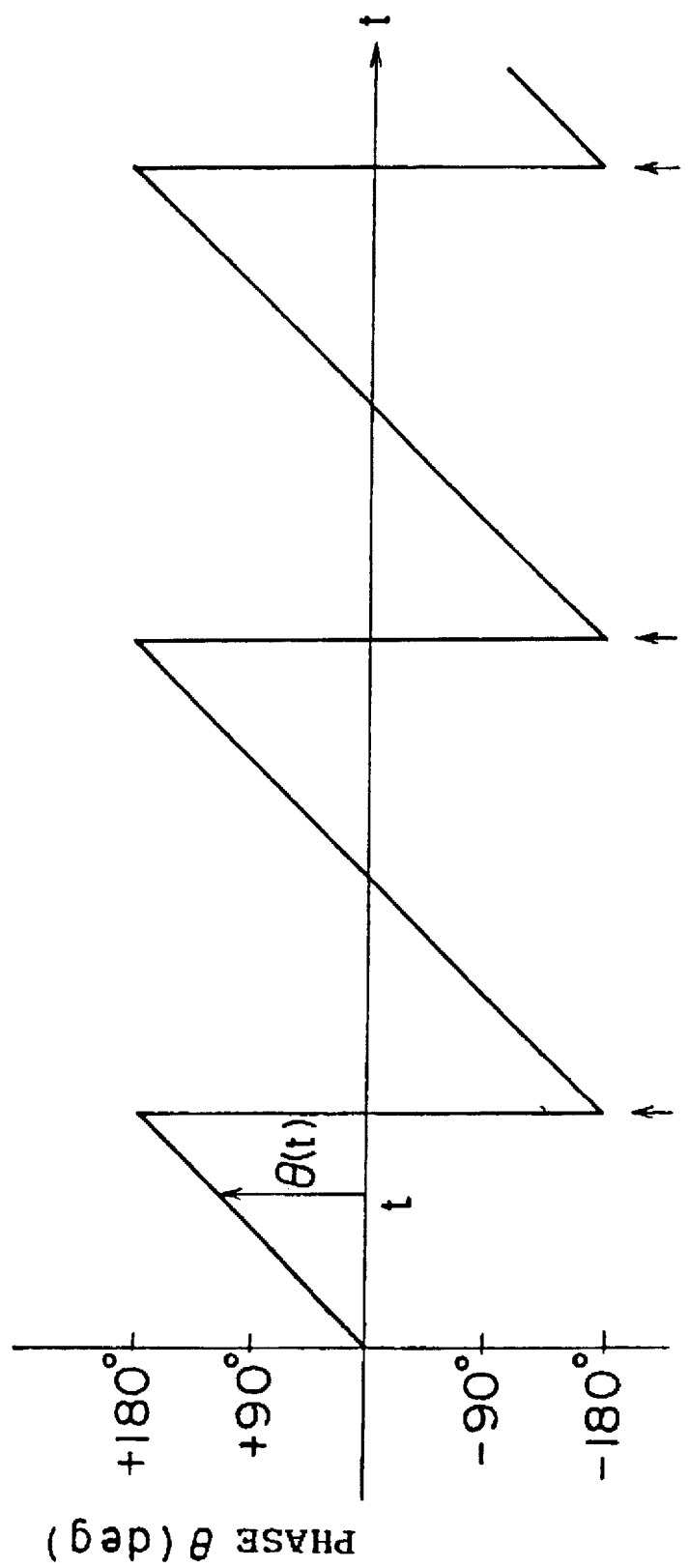
FIG. 21 is a diagram showing a change of a control signal phase with time.

It may be regarded that a phase θ of the control signal supplied from the VCO 352' on the side of the other polarized wave to the side of the one polarized wave periodically rotates, and the control signal is thus a triangular wave such as that shown in FIG. 21. If the phase of this control signal at a certain time is denoted by θ(t), an amplitude average value |θ(t)| of |θ(t)| during a long time can be described by the following formula (3).

$$|\hat{\theta}(t)| = \{1/(t_2 - t_1)\} \cdot \int_{t_1}^{t_2} |\theta(t)| dt \tag{3}$$

$$= 90°$$

Figure 22:
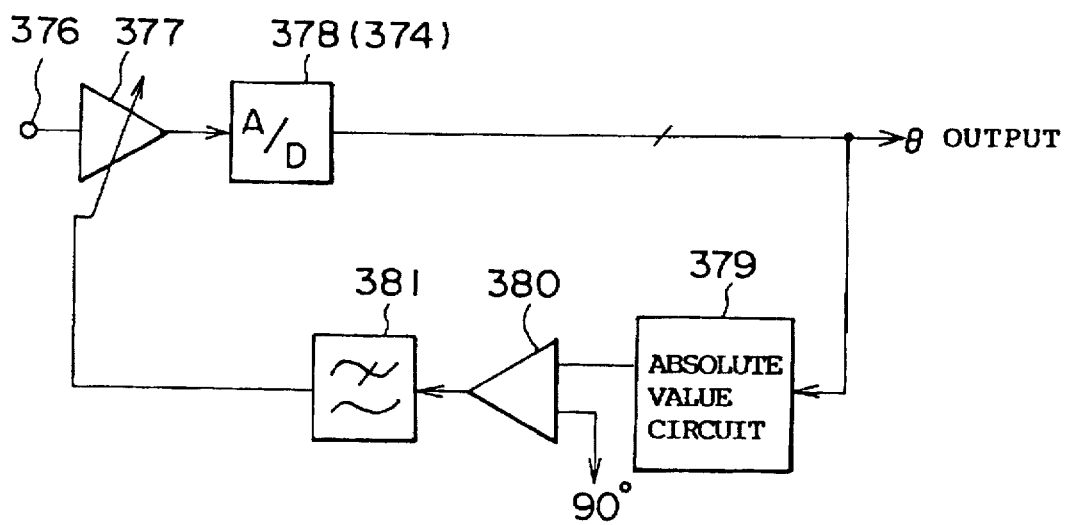
FIG. 22 is a system block diagram showing an embodiment of an automatic amplitude control circuit.

FIG. 22 shows the construction of an embodiment of the automatic amplitude control circuit using the formula (3). In FIG. 22, the above analog control signal input to a terminal 376 is supplied to an A/D converter 378 via a variable gain amplifier 377 and converted into a digital control signal. This A/D converter 378 corresponds to the A/D converter 374 shown in FIG. 20.

The output digital control signal of the A/D converter 378 (374) is supplied to an absolute value circuit 379 where the absolute value is obtained by a process such as removing the code bit, and is thereafter supplied to a differential amplifier 380 where the signal is converted into a control signal having a level depending on a difference from a reference digital value which indicates the above average value of 90°. This control signal is passed through a lowpass filter 381 which is formed by an up-down counter and an accumulator, and is applied to the variable gain amplifier 377 via a D/A converter (not shown) as the gain control voltage.

Figure 23:
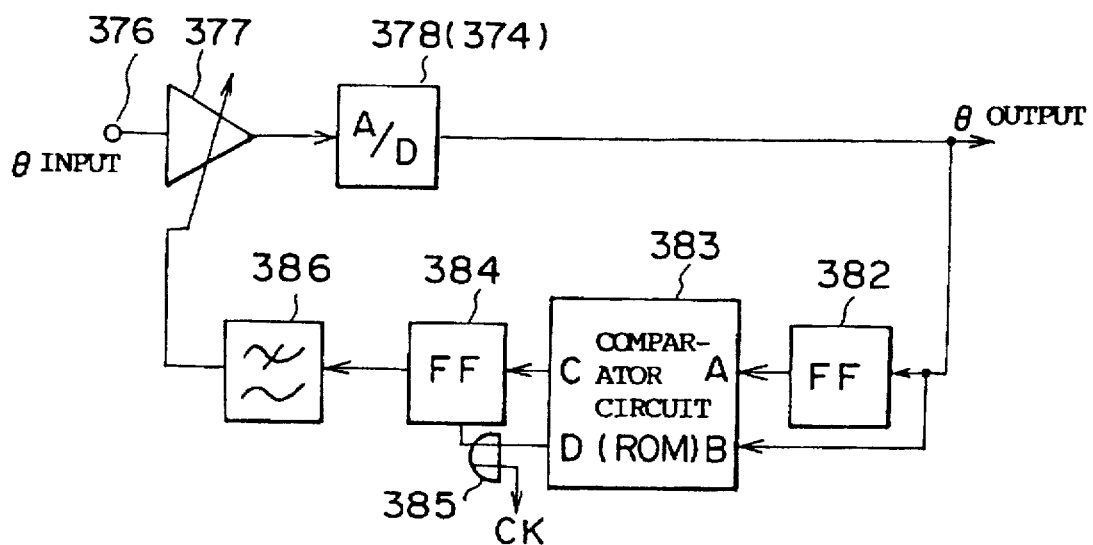
FIG. 23 is a system block diagram showing another embodiment of the automatic amplitude control circuit.
Figure 24:
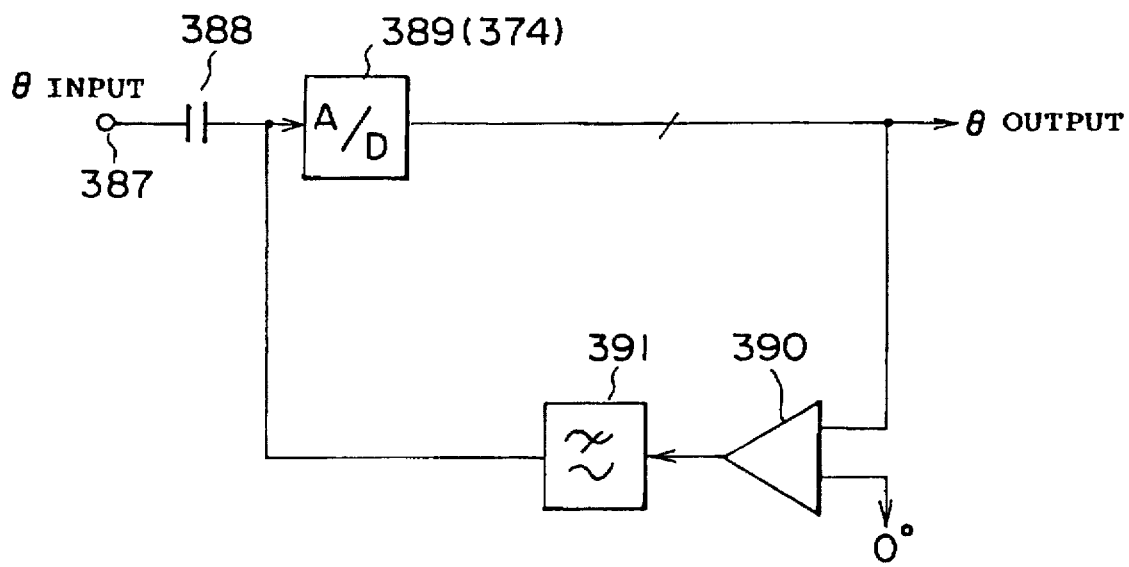
FIG. 24 is a system block diagram showing an embodiment of an automatic offset control circuit.

FIG. 23 shows the construction of another embodiment of the automatic amplitude control circuit. In FIG. 23, those parts which are the same as those corresponding parts in FIG. 22 are designated by the same reference numerals. In FIG. 23, the output digital signal of the A/D converter 378 (374) is input to a terminal A of a comparator circuit 383 via a flip-flop 382 on one hand, and is directly input to a terminal B of the comparator circuit 383 on the other.

As described above, the analog control signal has a phase θ which greatly changes from +180° to −180° as shown in FIG. 21. Hence, the comparator circuit 383 compares input values of the terminals A and B, and outputs a high level from a terminal D only when the two values change more greatly than a predetermined value from +180° to −180°, and otherwise outputs a low level from the terminal D. Accordingly, in a normal state where the input values of the terminals A and B of the comparator circuit 383 are smaller than the above predetermined value, a comparison result output from a terminal C of the comparator circuit 383 is latched in the flip-flop 384 responsive to a clock pulse CK which is applied via an OR circuit 385. On the other hand, if the input values of the terminals A and B are greater than the above predetermined value, the output signal of the OR circuit 385 becomes a high level and the output of the clock pulse is prohibited. Hence, the comparison result in this case is not latched in the flip-flop 384, and the previous value is held as it is.

Accordingly, the control voltage which is applied to the gain control terminal of the variable gain amplifier 377 from the flip-flop 384 via the D/A converter (not shown) and the lowpass filter 388 controls the gain of the variable gain amplifier 377 so that the phase θ of the control signal will not change to a value greater than +180° or to a value less than −180°.

In addition, the control circuit 373 may be the automatic offset control circuit, as described above. An embodiment of this automatic offset control circuit is shown in FIG. 24. In FIG. 24, the above analog control signal input from a terminal 382 is supplied to an A/D converter 389 via a capacitor 388. This A/D converter 389 corresponds to the above A/D converter 274.

An output digital control signal of the A/D converter 389 (374) is supplied to a differential amplifier 390 where the signal is compared with a reference value corresponding to a phase of 0°. A time average value |θ(t)| of the offset voltage of the analog control signal input to the terminal 387 indicates the phase of 0°, as may be seen from FIG. 21. Accordingly, a digital value of the difference of the offset voltage from the time average value is obtained from the differential amplifier 390. This digital value is passed through a D/A converter (not shown) and a lowpass filter 391 and added to the input analog control signal of the A/D converter 389 (374) so as to eliminate the offset voltage.

Figure 25:
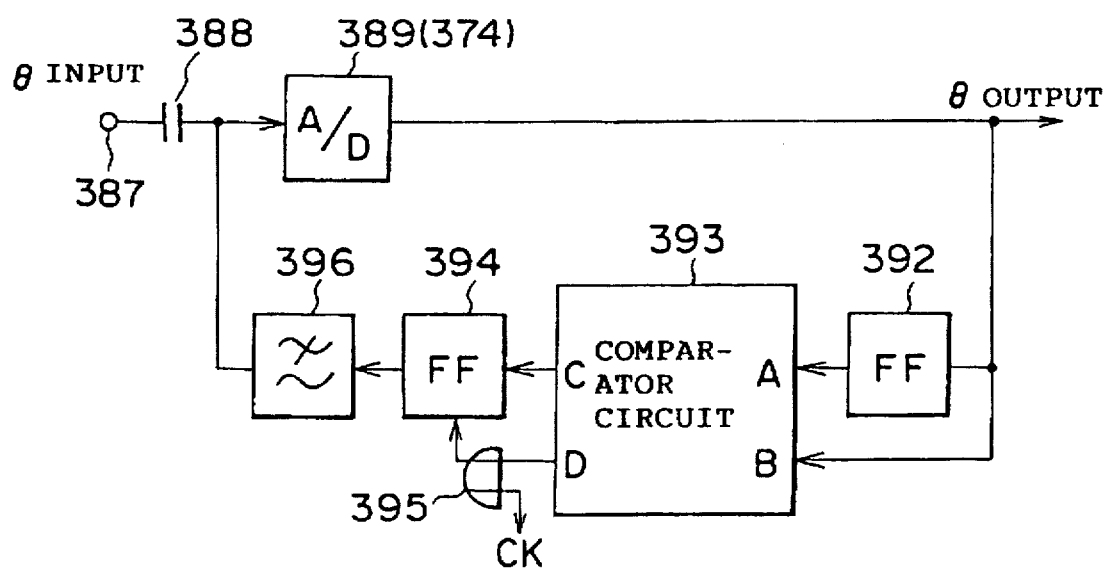
FIG. 25 is a system block diagram showing another embodiment of the automatic offset control circuit.

FIG. 25 shows the construction of another embodiment of the above automatic offset control circuit. In FIG. 25, when a digital control signal passed through a flip-flop 392 and a digital control signal not passed through this flip-flop 392 change by a value greater than a predetermined value, a comparator circuit 393 outputs from a terminal C a signal which indicates whether the value of the digital control signal is shifted towards the positive side or the negative side from −180° or +180°. This signal from the terminal C is supplied to a flip-flop 394. In addition, a low-level signal or a high-level signal is output from a terminal D of the comparator circuit 393.

When the value of the digital control signal is shifted towards the positive side from +180° or towards the negative side from −180°, no clock from an OR circuit 395 is input to the flip-flop 394, and thus, the flip-flop 394 does not latch the output of the comparator circuit 393 and holds the previous value. The output of this flip-flop 394 is passed through a D/A converter (not shown) and a lowpass filter 396 and is added to the input analog control signal of the A/D converter 389 (374).

In this embodiment, the output of the flip-flop 394 assumes a high level when the phase θ is greater than +180°, and in this case, a predetermined offset voltage is added to the input analog control signal of the A/D converter 389 (374). On the other hand, the output of the flip-flop 394 assumes a low level when the phase θ is less than −180°, and in this case, a predetermined offset voltage is subtracted from the above input analog control signal.

As indicated by a numeral 375, the control circuit 373 shown in FIG. 20 may be provided on the output side of the A/D converter 374. In this case, the A/D converter 374 is provided at a stage prior to the variable gain amplifier 377 and the capacitor 388 in FIGS. 22 through 25, and the circuit is formed by digital circuits.

In addition, when using both the automatic amplitude control circuit and the automatic offset control circuit, the two circuits are provided in parallel with respect to the output of the lowpass filter 372. The analog control signal is supplied to both the terminals 376 and 387, and the digital control signals output from the two circuits are added and supplied to the signal generating circuit 358.

Figure 26:
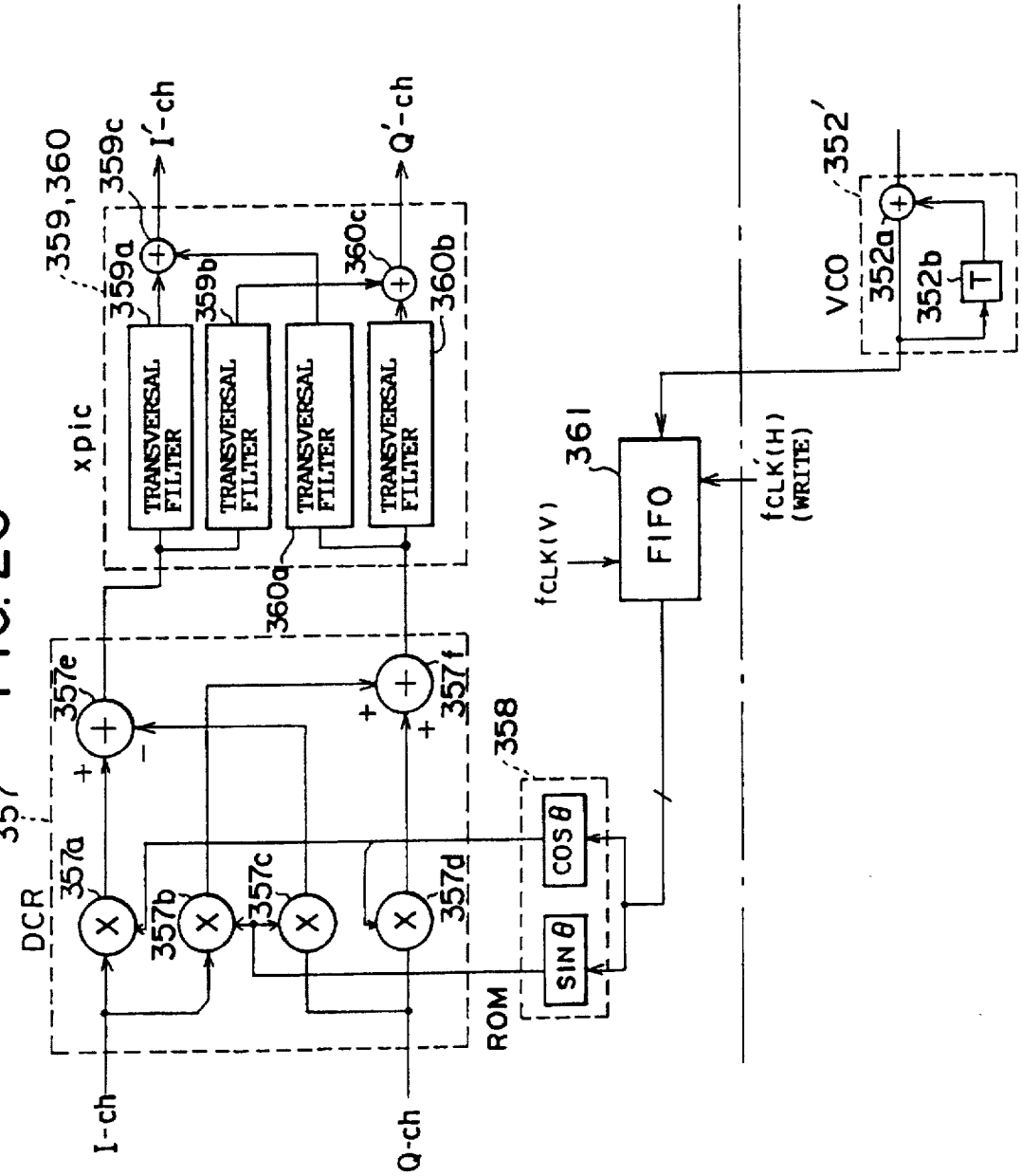
FIG. 26 is a system block diagram showing an embodiment of a phase rotation circuit and its peripheral part.

Next, a description will be given of an embodiment of the phase rotation circuit of the first and second embodiments of the cross polarization interference eliminating apparatus together with peripheral circuits thereof. FIG. 26 shows the phase rotation circuit (DCR) 357 and its peripheral circuits, and in FIG. 26, those parts which are the same as those corresponding parts in FIGS. 19 and 20 are designated by the same reference numerals, and a description thereof will be omitted.

In FIG. 26, the phase rotation circuit 357 is made up of multipliers 357a through 357d, and adders 357e and 357f. In addition, the XPIC 359 is made up of transversal filters 359a and 359b, and an adder 359c. The XPIC 360 is made up of transversal filters 360a and 360b, and an adder 360c. Further, the VCO 352' of on the side of the other polarized wave is made up of an adder 352a and a delay circuit 352b.

The data from the FIR digital filter 355 are supplied to the multipliers 357a and 357b, and the data from the FIR digital filter 356 are supplied to the multipliers 357e and 357d. In addition, the phase rotation signal (cosθ) from the signal generating circuit 358 is supplied to the multipliers 357a and 357d, and the phase rotation signal (sinθ) from the signal generating circuit 358 is supplied to the multipliers 358b and 358c. Outputs of the multipliers 357a and 357c are added in the adder 357e and supplied to the transversal filters 359a and 359b of the XPIC 359. Similarly, outputs of the multipliers 357b and 357d are added in the adder 357f and supplied to the transversal filter 360a and 350b of the XPIC 360. The adder 359c of the XPIC 359 adds outputs of the transversal filters 359a and 360a, and supplies an interference canceling signal to the adder 349 of the adder circuit 405. In addition, the adder 360c of the XPIC 360 adds outputs of the transversal filters 359b and 360b, and supplies an interference canceling signal to the adder 350 of the adder circuit 405.

On the other hand, the DCR control signal from the side of the other polarized wave is supplied to the adder 352a of the VCO 352'. An output data of this adder 352a is fed back to the adder 352a via the delay circuit 352b. The output data of the adder 352a shown in FIG. 27(a) is supplied to the retiming circuit 361 which is made up of a FIFO. The output data of this adder 352a is a phase rotation control signal which indicates the same phase rotation as the baseband signal on the side of the other polarized wave.

The retiming circuit 361 writes the phase rotation control signal from the VCO 352' responsive to a signal clock $f_{CLK}(H)$ shown in FIG. 27(b) of the other polarized wave, and reads the signal responsive to a signal clock $f_{CLK}(V)$ shown in FIG. 27(c) of the one polarized wave. Accordingly, the retiming circuit 361 supplies data shown in FIG. 27(d) to the signal generating circuit 358. As a result, the phase rotation signal from the signal generating circuit 358 is synchronized to the one polarization signal clock $f_{CLK}(V)$, and the baseband signal on the side of the other polarized wave is eliminated of the phase rotation based on the one polarization signal clock and output from the phase rotation circuit 357 as the reference signal. This reference signal is supplied to the XPICs 359 and 360.

Figure 27:
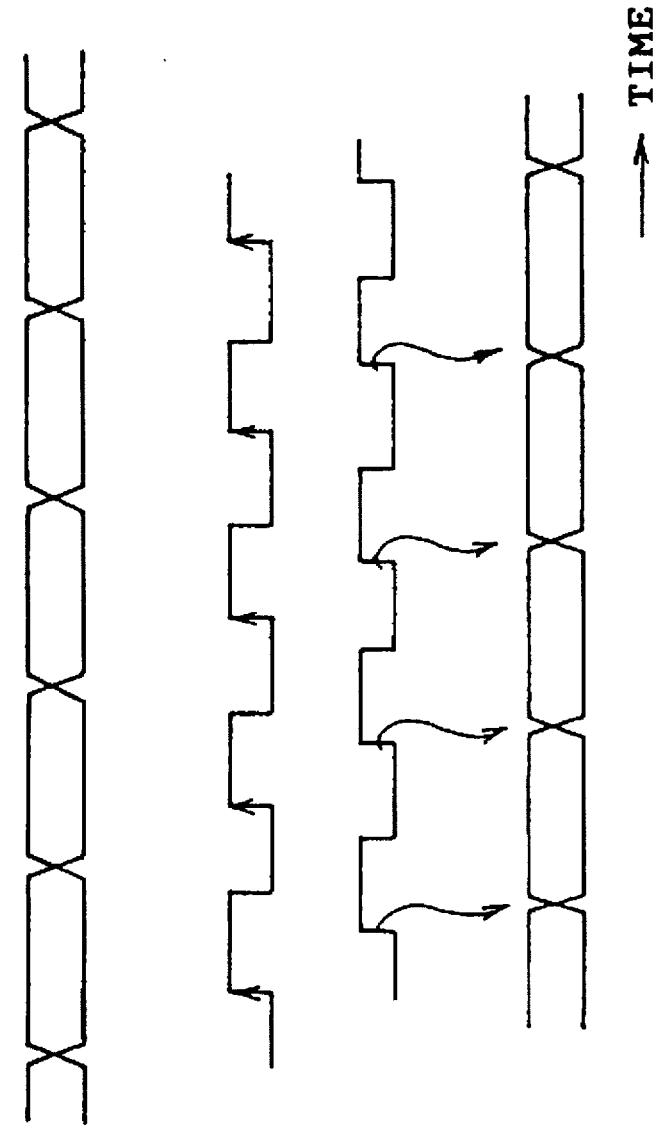
FIGS. 27(a–d) are a timing chart for explaining the operation of the phase rotation circuit shown in FIG. 26.

In the timing chart shown in FIG. 27, the signal timings are shown by assuming that the synchronizing clock is used between the two V and H polarizations at the transmitting side.

In FIG. 26, a circuit shown in FIG. 28 may be used in place of the retiming circuit 361. In FIG. 28, a circuit on the side of the one polarized wave is made up of flip-flops 701 through 706, an inverter circuit 707, a delay circuit 708, comparator circuits 711 through 713, and a selection circuit 714. In addition, a flip-flop 715 is included in a circuit on the side of the other polarized wave. The phase rotation control signal of the VCO 352' shown in FIG. 27(a) and the other polarization signal clock $f_{CLK}(H)$ are supplied to this flip-flop 715, and the flip-flop 715 supplies phase rotation information shown in FIG. 29(a) to the flip-flops 701 and 702.

The one polarization signal clock $f_{CLK}(V)$ shown in FIG. 29(b) is supplied to the flip-flop 701. On the other hand, since the other polarization signal clock $f_{CLK}(V)$ is also supplied to the inverter circuit 707, an inverted one polarization signal clock $\overline{f_{CLK}}(V)$ shown in FIG. 29(c) is supplied to the flip-flop 702. Hence, data shown in FIG. 29(d) and (e) are respectively output from the flip-flops 701 and 702. The output data of the flip-flop 701 is supplied to the flip-flop 703 and the comparator circuit 711. Because the output data of the flip-flop 703 is also supplied to the comparator circuit 711, the comparator circuit 711 compares the data shown in FIG. 29(d) and the data of 1 period T before, and supplies a comparison result to the comparator circuit 713. On the other hand, the output data of the flip-flop 702 is subjected to a time delay in the delay circuit 708, and the output data of the delay circuit 708 shown in FIG. 29(d) is supplied to the flip-flop 704 and the comparator circuit 712. Since the output data of the flip-flop 704 is also supplied to the comparator circuit 712, the comparator circuit 712 compares the data shown in FIG. 29(f) and the data of 1 period T before, and supplies a comparison result to the comparator circuit 713.

The comparator circuit 713 compares the output data of the comparator circuits 711 and 712, and supplies a comparison result to the selection circuit 714. The selection circuit 714 receives the output data of the flip-flop 703 via the flip-flop 705, and receives the output data of the flip-flop 704 via the flip-flop 706. The selection circuit 714 selectively outputs one of the output data of the flip-flops 705 and 706 to the signal generating circuit 358 depending on the output of the comparator circuit 713. Since the above comparator circuits 711 through 713 form a circuit which eliminates the data read error due to the non-synchronous clocks of the V and H polarizations, the selection circuit 714 selectively outputs one of the output data of the flip-flops 705 and 706 having the smaller difference of the time-sequential data as the correct data.

Figure 30:
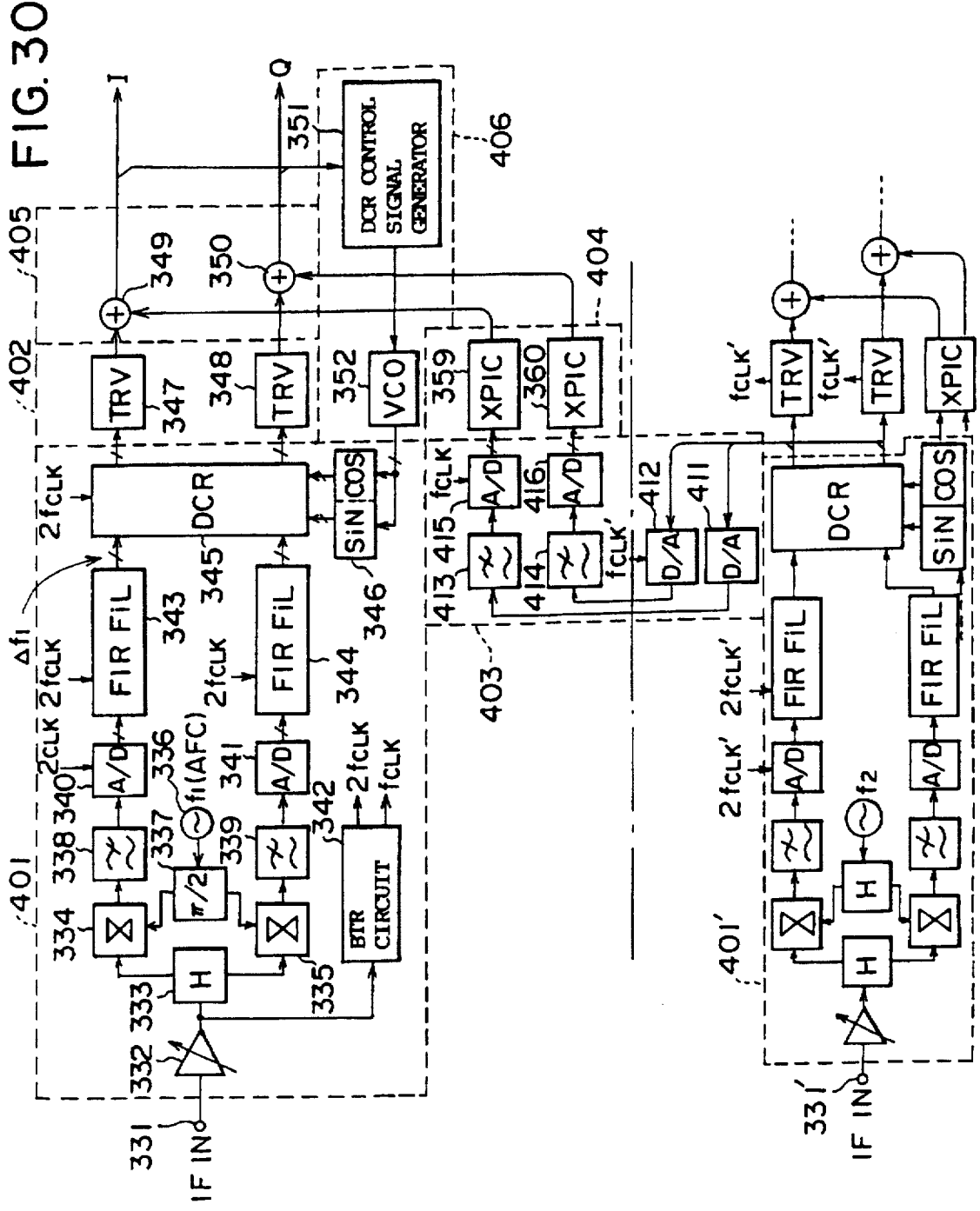
FIG. 30 is a system block diagram showing a third embodiment of the cross polarization interference eliminating apparatus.

FIG. 30 shows the construction of a third embodiment of the cross polarization interference eliminating apparatus according to the present invention. In FIG. 30, those parts which are the same as those corresponding parts in FIGS. 18 and 19 are designated by the same reference numerals, and a description thereof will be omitted. This embodiment is characterized in that, the reference signal generating circuit 403 includes D/A converters 411 and 412 supplied with the baseband signals (demodulated data) eliminated of the phase rotation by the demodulator means 401' on the side of the other polarized wave, lowpass filters 413 and 414 for eliminating the aliasing noise and supplied with output signals of the respective D/A converters 411 and 412, and A/D converters 415 and 416 supplied with output signals of the respective lowpass filters 413 and 414, as shown in FIG. 21.

Continuous analog demodulated signals are obtained from the D/A converters 411 and 412 based on the other polarization signal clock $f_{CLK}$. The analog demodulated signals are already eliminated of the phase rotation, and are supplied to the A/D converters 415 and 416 via the respective lowpass filters 413 and 414. The demodulated signals are converted into reference signals of the one polarized wave in the A/D converters 415 and 416 based on the one polarization signal clock $f_{CLK}$ and thereafter input to cross polarization interference cancelers 359 and 360.

Figure 31:
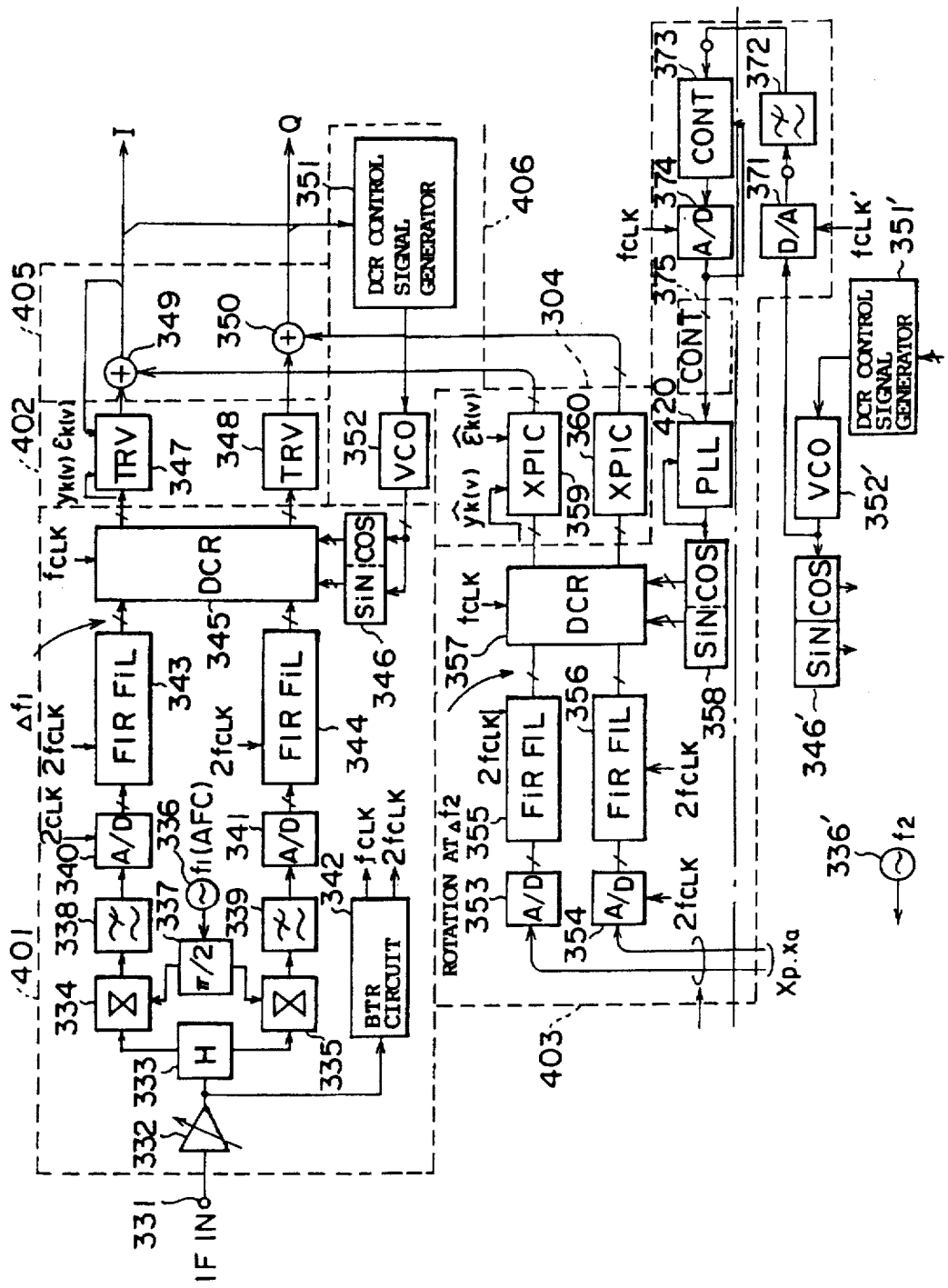
FIG. 31 is a system block diagram showing a fourth embodiment of the cross polarization interference eliminating apparatus.

FIG. 31 shows the construction of a fourth embodiment of the cross polarization interference eliminating apparatus according to the present invention. In FIG. 31, those parts which are the same as those corresponding parts in FIGS. 18 and 20 are designated by the same reference numerals, and a description thereof will be omitted. This embodiment is characterized in that, a phase locked loop circuit (PLL circuit) 420 shown in FIG. 31 is provided on the output side of the A/D converter 374 of the second embodiment shown in FIG. 20.

This PLL circuit 420 makes the rapid change of the phase information of the output digital signal of the A/D converter 374 or control circuit 375 gradual, so as to stably change the phase rotation information θ which is supplied from the demodulating system of the other polarized wave to the demodulating system of the one polarized wave. Accordingly, it is possible to solve the problem of error generation and lack of accuracy in the A/D converter 374 and the D/A converter 371.

Figure 32:
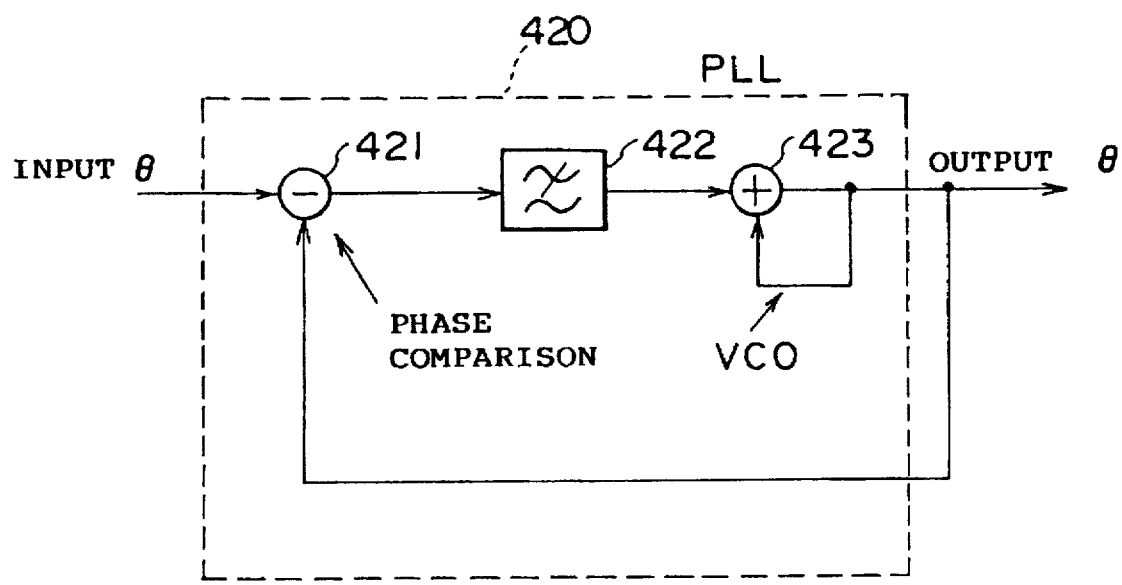
FIG. 32 is a system block diagram showing an embodiment of a PLL circuit.

FIG. 32 is a circuit diagram showing an embodiment of the above PLL circuit 420. In FIG. 32, input digital control signal having the phase information θ is supplied to a subtracter 421 where the input digital control signal is subjected to a subtraction with an output digital control signal of the PLL circuit 420 and is converted into a signal indicative of the phase error. Accordingly, the subtracter 421 forms a phase comparator.

This phase error information is input to an adder 423 via a lowpass filter 422 which is formed by an up-down counter and an accumulator. An output digital signal of this adder 423 is fed back to the input side of this adder 423, and carries out an operation corresponding to that of a voltage controlled oscillator (VCO). The output signal of the adder 423 is supplied to the above signal generating circuit 358 as the output digital control signal on one hand, and is fed back to the subtracter 421 on the other.

The cross polarization interference eliminating apparatus according to the present invention is not limited to the embodiments described above. In principle, it is possible to omit the control circuits 373 and 375 in each of the embodiments shown in FIGS. 20 and 31.

As described above, according to the cross polarization interference eliminating apparatus of the present invention, the interference wave component from the side of the other polarized wave leaking within the demodulated data obtained from the transversal equalizer, and the interference canceling signal from the cross polarization interference canceler, can be made to be synchronized signals. For this reason, even if the quasi-synchronous detection system is employed, it is possible to greatly reduce or eliminate the cross polarization interference. Hence, the digital signal processing becomes possible in the demodulator to a large extent, thereby contributing to the reduction in the size and weight of the demodulator and to the high reliability of the demodulator.

In a quadrature demodulating circuit which obtains the two demodulated baseband signals of the quadrature signal (Q-signal) and the synchronous signal (I-signal) by the quasi-synchronous detection system, it is desirable to simplify the construction of the filter and the like.

Figure 33:
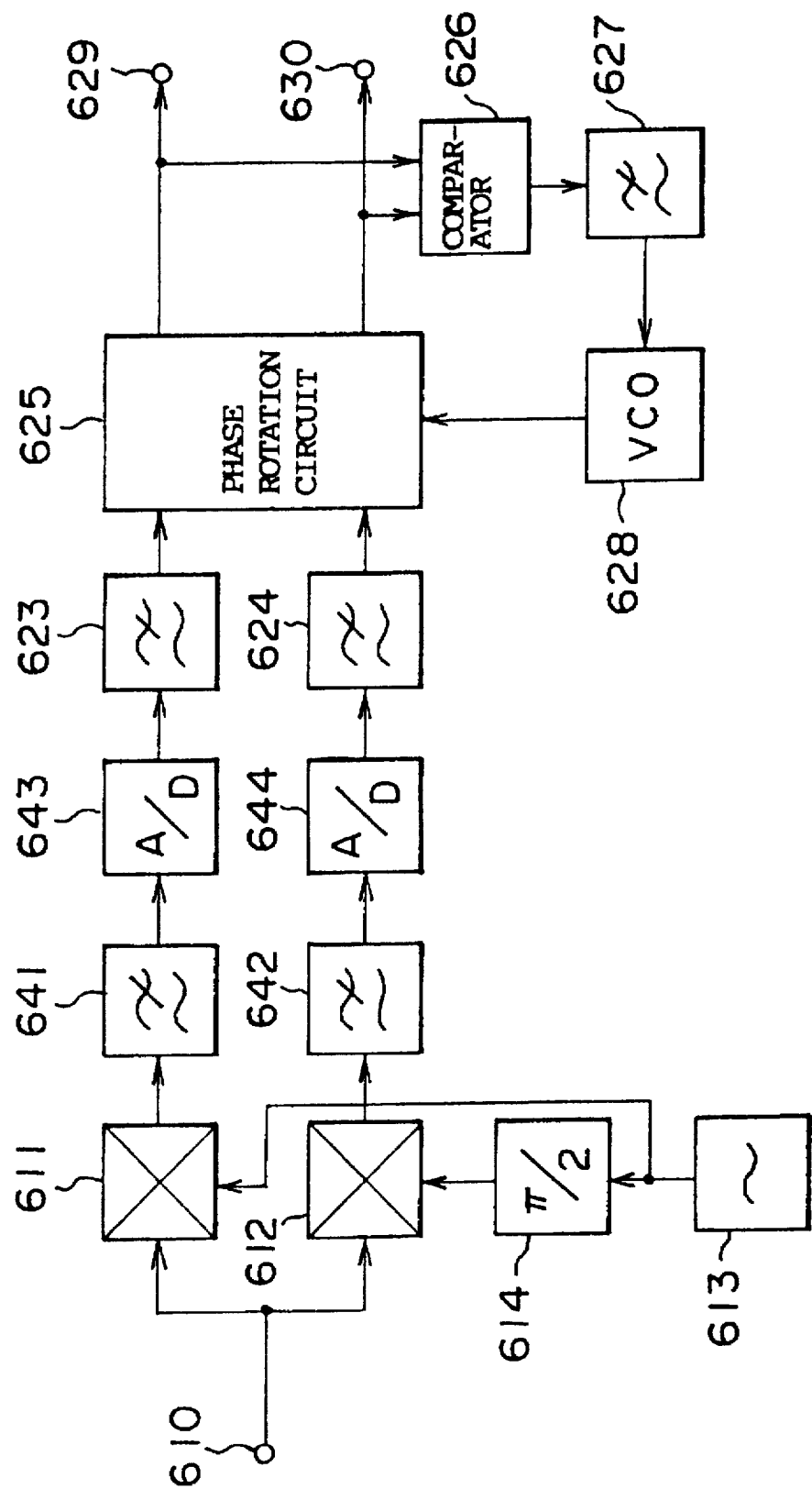
FIG. 33 is a block diagram showing an example of a conventional quadrature demodulating circuit.

FIG. 33 is a block diagram showing an example of a conventional quadrature demodulating circuit. In FIG. 33, a digital modulated signal modulated by the QAM system, for example, is input to an input terminal 610 and supplied to each of multipliers 611 and 612. In the multipliers 611 and 612, the digital modulated signals are multiplied with respective demodulating carriers which have mutually orthogonal phases and are respectively obtained from an oscillator 613 and a π/2 phase shifter 614.

The demodulating carrier having the oscillation frequency of the above oscillator 613 is a fixed frequency close to the carrier frequency of the input digital modulated signal, and two analog baseband signals of the frequency difference between the two are obtained as demodulated signals from the multipliers 611 and 612. The above analog baseband signals which are obtained by once carrying out the demodulation, are passed through lowpass filters 641 and 642 which are analog circuits and are supplied to A/D converters 643 and 644 where the signals are subjected to analog-to-digital conversions.

Lowpass filters 641 and 642 are analog filter circuits for eliminating the frequency which is ½ the clock frequency (sampling frequency) of the following A/D converters 643 and 644. In other words, the lowpass filters 641 and 642 are filter circuits which are often referred to as anti-aliasing filters, and are provided so that the aliasing noise will not be included in the output digital signals of the A/D converters 643 and 644.

The digital signals having a sampling frequency $f_S$ are independently obtained from the A/D converters 643 and 644 are supplied to the digital lowpass filters 623 and 624 wherein the unwanted high-frequency component is eliminated, and are thereafter supplied to the phase rotation circuit 625. The digital lowpass filters 623 and 624 are roll-off filters for giving roll-off characteristics to the input digital signals, and respectively output the I-signal and the Q-signal.

The output signals of the phase rotation circuit 625 are compared in the comparator 626, and the phase error signal output from the comparator 626 is supplied to the voltage controlled oscillator (VCO) 628 via the loop filter 627. Based on the oscillation frequency which is received as a control code from the VCO 628, the phase rotation circuit 625 carries out a phase rotation process in a direction so as to eliminate the rotation of the signal points in the signal space of the input I-signal and Q-signal. Hence, demodulated signals of the I-signal and the Q-signal are output to the output terminals 629 and 630.

Therefore, the quadrature demodulating circuit employing the quasi-synchronous detection system which demodulates the digital modulated signals without reproducing the carriers is suited for being made in the form of a large scale semiconductor integrated circuit (LSI).

However, when the quasi-synchronous detection is carried out in the above conventional quadrature demodulating circuit, the phase rotation occurs in the output baseband signals of the multipliers 611 and 612 depending on the frequency difference of the carrier of the input digital modulated wave and the output oscillation frequency of the oscillator 613. Hence, the desired attenuation cannot be obtained by the lowpass filters (roll-off filters) 645 and 646 when the above frequency difference is large, and the bit error rate of the demodulated data is deteriorated.

In addition, because the cutoff frequency $f_S/2$ of the anti-aliasing filters 641 and 642 are close to the upper limit frequency of the baseband signal, these filters must have a lowpass filter characteristic having a sharp slope. For this reason, there is also a problem in that the circuit construction of the anti-aliasing filters 641 and 642 becomes complex.

Accordingly, a description will now be given of embodiments of the quadrature demodulating circuit which eliminates the above problem by setting the sampling frequency of the digital signal to a high frequency.

Figure 34:
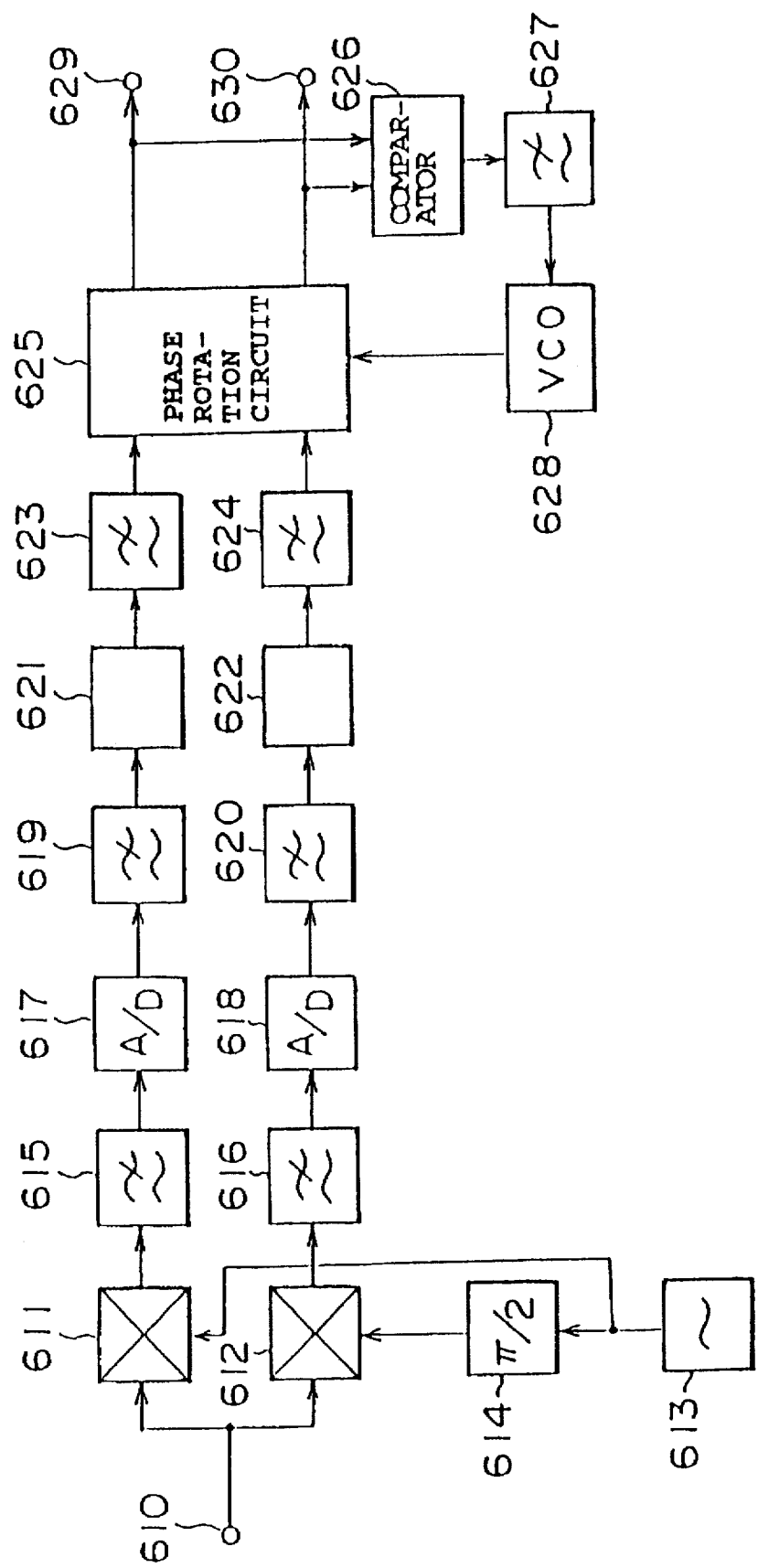
FIG. 34 is a block diagram showing a first embodiment of a quadrature demodulating circuit.

FIG. 34 is a block diagram showing a first embodiment of the quadrature demodulating circuit. In FIG. 34, those parts which are the same as those corresponding parts in FIG. 23 are designated by the same reference numerals, and a description thereof will be omitted. In FIG. 34, the first and second analog baseband signals which have been subjected to the quasi-synchronous detection and are obtained from the multipliers 611 and 612 are eliminated of the high-frequency components in analog lowpass filters 615 and 616 before being supplied to respective A/D converters 617 and 618.

The sampling frequency of the A/D converters 617 and 618 are set to a frequency of $2f_S$, for example, which is higher than the existing sampling frequency $f_S$, and for this reason, the analog lowpass filters 615 and 616 are provided as anti-aliasing filters so that no aliasing noise is included in the output digital signals of the A/D converters 617 and 618. The digital signals having the sampling frequency $2f_S$ and obtained from the A/D converters 617 and 618 are eliminated of the high-frequency components of the aliasing frequency or greater in respective digital lowpass filters 619 and 620 before being supplied to speed conversion circuits 621 and 622. Since the sampling frequency is converted back to the conventional frequency S in the following speed conversion circuits 621 and 622, the digital lowpass filters 619 and 620 are provided as anti-aliasing filters so that no aliasing noise is included in the output digital signals of the speed conversion circuits 621 and 622.

Figure 35:
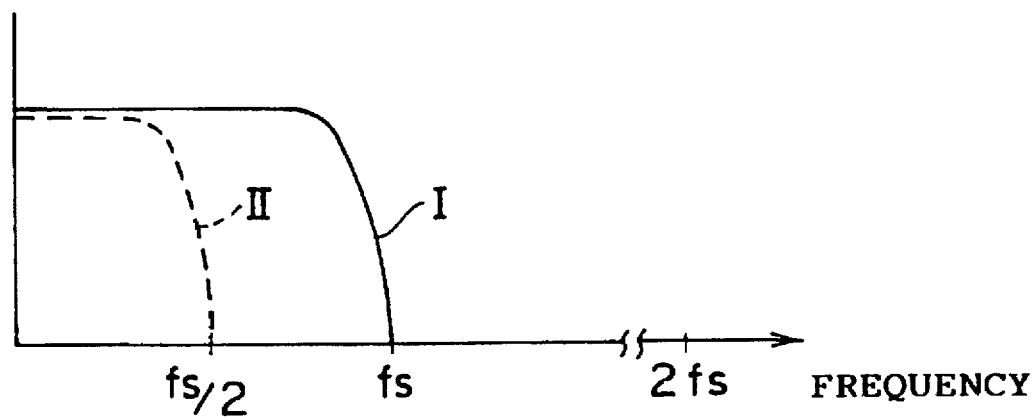
FIG. 35 is a diagram for explaining a filter characteristic.

According to this embodiment, the high-frequency components of the frequency $f_S/2$ or greater are eliminated as in the conventional case by the analog lowpass filters 615 and 616 and the digital lowpass filters 619 and 620. The frequency characteristic of the analog lowpass filters 615 and 616 becomes as indicated by a solid line I in FIG. 35. Compared to the frequency characteristic of the conventional analog lowpass filters 641 and 642 indicated by a dotted line II in FIG. 35, it may be seen that the frequency characteristic of the analog lowpass filters 615 and 616 may have a more gradual slope. For this reason, compared to the conventional analog lowpass filters 641 and 642, the analog lowpass filters 615 and 616 may be formed by simple circuits having a smaller number of filter stages. The frequency characteristic of the digital lowpass filters 619 and 620 is similar to the frequency characteristic indicated by the dotted line II in FIG. 35.

The speed conversion circuits 621 and 622 are provided to obtain digital signals having the same sampling frequency $f_S$ as the conventional case, so as not to increase the processing speed of the digital lowpass filters 623 and 624 at the following stage. For example, the speed conversion circuit is made up of two D-type flip-flops 651 and 652 as shown in FIG. 36.

Figure 36:
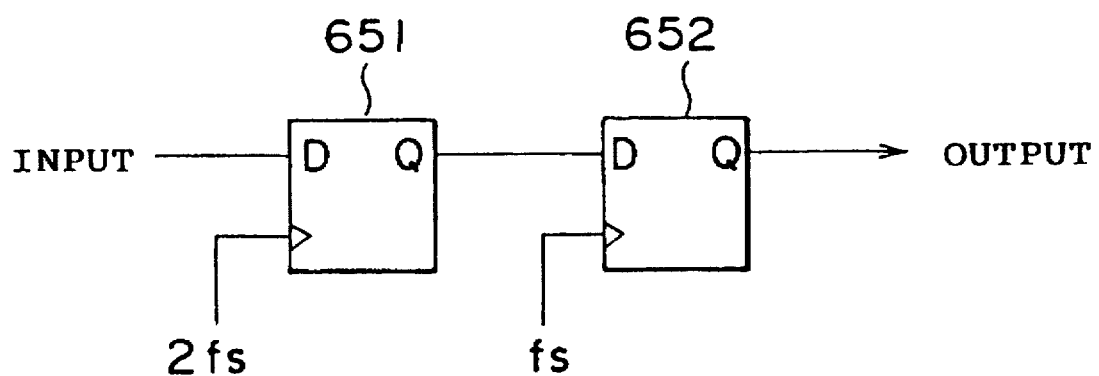
FIG. 36 is a circuit diagram showing an embodiment of a speed conversion circuit.

In FIG. 36, the output digital signal of the digital lowpass filter 619 or 620 is input to a data input terminal of the D-type flip-flop 651, and a first clock pulse having a frequency of $2f_S$ is applied to a clock terminal of the D-type flip-flop 651. Hence, the input digital signal which is latched by the first clock pulse is obtained from a Q-output terminal of the D-type flip-flop 651 and is applied to a data input terminal of the D-type flip-flop 652.

The D-type flip-flop 652 latches this input digital signal by a second clock pulse having the frequency $f_S$. In other words, the digital signal which is obtained from a Q-output terminal of the D-type flip-flop 652 is obtained by converting the sampling frequency of the digital signal which has the sampling frequency $2f_S$, is applied to the data input terminal of the D-type flip-flop 651 and is decimated into the sampling frequency $f_S$.

The above digital lowpass filters 623 and 624 shown in FIG. 34 which are input with the speed converted digital signals are roll-off filters which carry out wave shaping, and eliminate the unwanted high-frequency components. As described in conjunction with FIG. 33, the phase rotation circuit 625 mutually cancel the phase rotation of the input digital signals together with the comparator 626, the lowpass filter 627 and the VCO 628.

Figure 37:
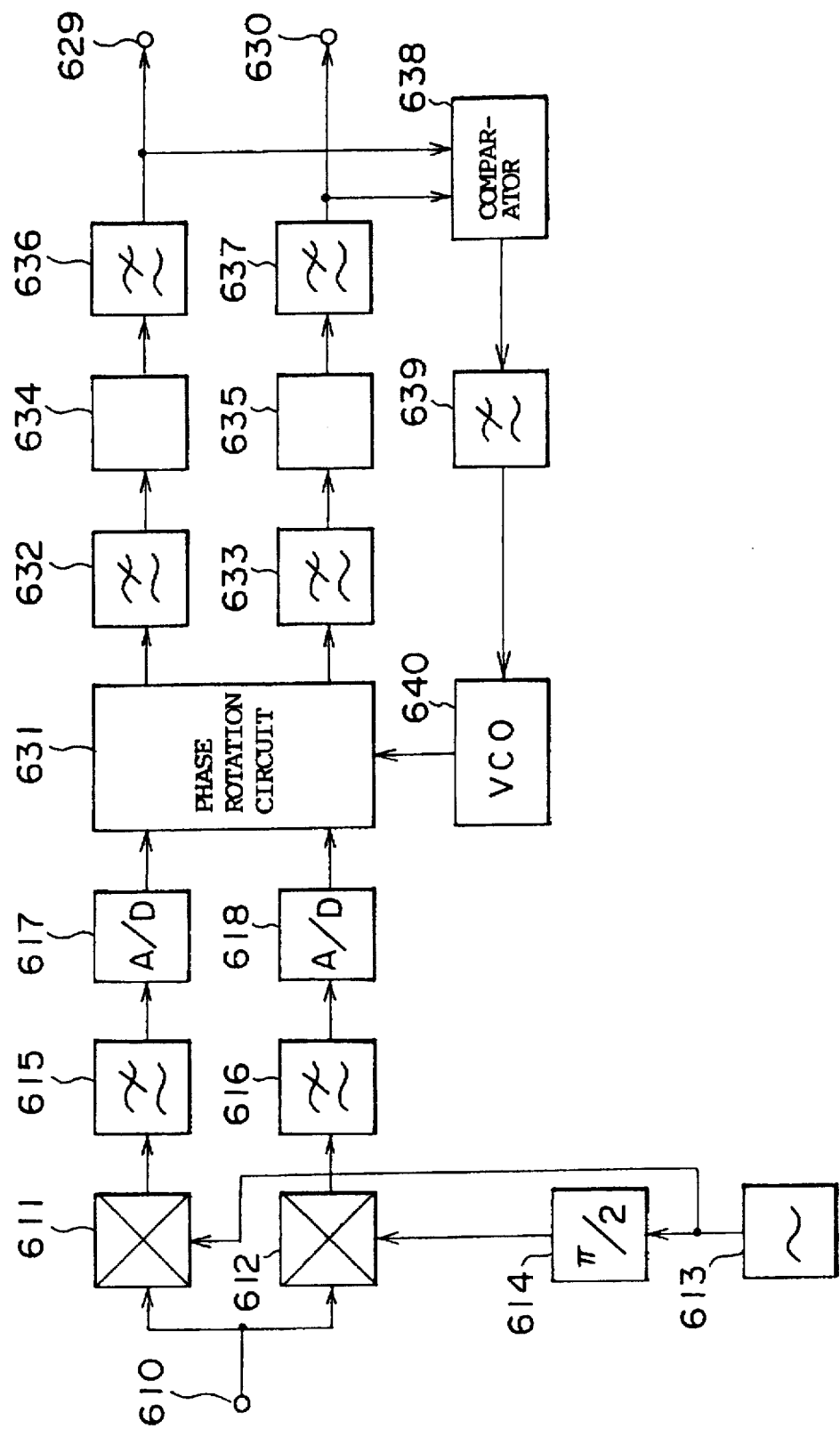
FIG. 37 is a block diagram showing a second embodiment of the quadrature demodulating circuit.

FIG. 37 is a block diagram showing a second embodiment of the quadrature demodulating circuit. In FIG. 37, those parts which are the same as those corresponding parts in FIG. 34 are designated by the same reference numerals, and a description thereof will be omitted. In FIG. 37, output digital signals of A/D converters 617 and 618 are supplied to a phase rotation circuit 631.

A comparator 638 compares the phases of the output demodulated data of two channels, and an output error signal of the comparator 638 is applied to a VCO 640 as a control code via a loop filter 639. The oscillation frequency of the VCO 640 is controlled by a feedback control depending on the frequency difference. The phase rotation circuit 631 mutually cancels the phase rotation of the input digital signals based on the oscillation frequency of the VCO 640. The construction of this phase rotation circuit 631 itself is the same as that of the phase rotation circuit 625, but the phase rotation circuit 631 operates at twice the speed as that of the phase rotation circuit 625.

The output digital signals of the phase rotation circuit 631 are eliminated of the high-frequency components of the aliasing frequency $f_s/2$ or greater in respective digital lowpass filters 632 and 633, and supplied to speed conversion circuits 634 and 635 which convert the sampling frequency from $2f_s$ to $f_s$. Output digital signals of the speed conversion circuits 634 and 635 are subjected to wave shaping in digital lowpass filters 636 and 637 which are called roll-off filters, and are output to output terminals 629 and 630 as demodulated data of the I-signal and the Q-signal. The demodulated data are also input to the comparator 638.

According to this embodiment, the phase rotation circuit 631 mutually cancels the phase rotation of the digital signals prior to being input to the roll-off filters 636 and 637. For this reason, even if the frequency difference between the input digital modulated signal and the output oscillation frequency of the oscillator 613 is large, it is possible to input the digital signals to the roll-off filters 636 and 637 after eliminating the effects of this frequency difference. Accordingly, this embodiment can prevent deterioration of the bit error rate even if the above frequency difference is large.

The demodulated data can also be obtained similarly to the above method with respect to the digital signals which are modulated according to the FSK system, the PSK system and the like. With respect to the digital signals modulated according to the FSK system, the demodulated signals are obtained from the input sides of the VCOs 628 and 640.

As described above, according to the first embodiment of the quadrature demodulating circuit, the slope of the frequency characteristic of the analog filter on the input side of the A/D converter can be made more gradual compared to the conventional case. For this reason, the circuit construction of the above analog filter which is an anti-aliasing filter can be made simple without increasing the processing speed of the roll-off filter. In addition, according to the second embodiment of the quadrature demodulating circuit, the phase rotation elimination is carried out with respect to the input digital signal of the roll-off filter. For this reason, it is possible to carry out the demodulation without deteriorating the bit error rate, even when the frequency difference between the input digital modulated signal and the demodulating carrier from the oscillator used for the quasi-synchronous detection is large.

Further, the present invention is not limited to these embodiments, but various variations and modifications may be made without departing from the scope of the present invention.

INDUSTRIAL APPLICABILITY

As described above, according to the cross polarization interference canceler of the present invention, a negative feedback path for suppressing the D.C. offset accompanying the digital conversion of the demodulated signal which is the subject of the cancellation at the stage prior to the interference canceling means which cancels the interference between the channels adapted to the differing polarization sharing system. Hence, the D.C. offset can be stable suppressed even in a state where a demodulated signal corresponding to the interference wave is not given. In addition, by making a negative feedback of the D.C. offset accompanying the digital conversion of the demodulated signal of the interference wave to the interference canceling means, it is possible to suppress the transmission of the D.C. offset with respect to the output end of the interference canceling means. On the other hand, according to the cross polarization interference eliminating apparatus of the present invention, the interference wave component from the side of the other polarized wave leaking within the demodulated data obtained from the transversal equalizer, and the interference canceling signal from the cross polarization interference canceler, can be made to be synchronized signals. For this reason, it is possible to greatly reduce or eliminate the cross polarization interference even if the quasi-synchronous detection system is employed. As a result, it is possible to carry out the digital signal processing to a large extent in the demodulator, and this greatly contributes to the reduction in the size and weight of the demodulator and to the improved reliability of the demodulator. Furthermore, in the quadrature demodulating circuit, the slope of the frequency characteristic of the analog filter on the input side of the A/D converter is made more gradual compared to the conventional case, and the circuit construction of the above analog filter which is an anti-aliasing filter can be made simple, without increasing the processing speed of the roll-off filter. In addition, by carrying out the phase rotation elimination with respect to the input digital signal of the roll-off filter, it is possible to carry out the demodulation without deteriorating the bit error rate even if the frequency difference is large between the input digital modulated signal and the demodulating carrier from the oscillator which is used for the quasi-synchronous detection.

I claim:

1. A cross polarization interference canceler comprising:
    digital conversion means for subjecting a demodulated signal of one channel to an analog-to-digital conversion out of two channels which are independently formed using carriers having the same frequency but having planes of polarization which are mutually orthogonal;
    interference canceling means for canceling interference caused by another channel of said two channels, with respect to the demodulated signal which is digitally converted by said digital conversion means; and
    integrator means for carrying out an integration process with respect to the demodulated signal which is digitally converted by said digital conversion means to provide a negative feedback to said digital conversion means so that a D-C offset introduced by the analog-to-digital conversion is eliminated by said negative feedback.

2. The cross polarization interference canceler as claimed in claim 1, wherein said interference canceling means includes drift control means for carrying out a drift control with respect to said another channel independently of a drift control with respect to the demodulated signal of said one channel.

3. A cross polarization interference canceler comprising:

digital conversion means for subjecting a demodulated signal of one channel to an analog-to-digital conversion out of two channels which are independently formed using carriers having the same frequency but having planes of polarization which are mutually orthogonal;

interference canceling means for canceling interference caused by said one channel of said two channels by subtracting from a demodulated signal of another channel of said two channels, a component of the demodulated signal being digitally converted by said digital conversion means; and integrator means for carrying out an integration process with respect to the demodulated signal which is cancelled of the interference by said interference canceling means to provide a negative feedback to said interference canceling means so that a D.C. offset introduced by the analog-to-digital conversion is eliminated by said negative feedback.

4. The cross polarization interference canceler as claimed in claim 3, wherein said interference canceling means includes drift control means for carrying out a drift control with respect to said another channel independently of a drift control with respect to the demodulated signal of said one channel.

* * * * *